(12) United States Patent
Fukushima et al.

(10) Patent No.: US 8,766,882 B2
(45) Date of Patent: Jul. 1, 2014

(54) THREE-DIMENSIONAL IMAGE DISPLAY APPARATUS FOR DISPLAYING THREE-DIMENSIONAL IMAGE

(75) Inventors: Rieko Fukushima, Tokyo (JP); Yuzo Hirayama, Yokohama (JP); Kazuki Taira, Tokyo (JP); Tatsuo Saishu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1111 days.

(21) Appl. No.: 12/201,549

(22) Filed: Aug. 29, 2008

(65) Prior Publication Data

US 2009/0002262 A1    Jan. 1, 2009

Related U.S. Application Data

(63) Continuation of application No. PCT/JP2008/055185, filed on Mar. 14, 2008.

(30) Foreign Application Priority Data

Mar. 29, 2007    (JP) .................................. 2007-089530

(51) Int. Cl.
*G09G 3/20*    (2006.01)
(52) U.S. Cl.
USPC ............... 345/55; 345/204; 349/15; 359/458; 359/462
(58) Field of Classification Search
USPC ........ 349/15; 359/458, 462–477; 345/55, 204
See application file for complete search history.

(56) References Cited

U.S. PATENT DOCUMENTS

| | | | |
|---|---|---|---|
| 5,953,148 A * | 9/1999 | Moseley et al. | ................ 359/237 |
| 6,064,424 A | 5/2000 | Van Berkel et al. | |
| 6,118,584 A | 9/2000 | Van Berkel et al. | |
| 6,243,055 B1 * | 6/2001 | Fergason | ........................ 345/32 |
| 6,801,243 B1 | 10/2004 | Van Berkel | |
| 2005/0083246 A1 | 4/2005 | Saishu et al. | |
| 2008/0079662 A1 | 4/2008 | Saishu et al. | |

FOREIGN PATENT DOCUMENTS

| | | |
|---|---|---|
| EP | 0 833 184 A1 | 4/1998 |
| JP | 10-505689 | 6/1998 |
| JP | 10-186294 | 7/1998 |
| JP | 3027506 | 1/2000 |

(Continued)

OTHER PUBLICATIONS

Official Communication from the Korean Patent Office for counterpart application No. KR 10-2009-7019279, dated Feb. 15, 2011 (5 pages).

(Continued)

*Primary Examiner* — Michael Pervan
(74) *Attorney, Agent, or Firm* — Finnegan, Henderson, Farabow, Garrett & Dunner, LLP

(57) ABSTRACT

In an apparatus for displaying a three-dimensional image, sub-pixels having color components are arranged in a longitudinal direction and in a lateral direction in a matrix form, in a display section for displaying a flat image, and a light ray control element is disposed so as to be opposed to the display section. In the light ray control element, linear optical openings extending in a vertical direction are arranged in the lateral direction. A sum of opening area lengths of opening areas of a plurality of sub-pixels adjacent to each other in a horizontal direction is varied in a single row, and the sum thereof in a plurality of rows becomes constant. Further, an arrangement of the sub-pixels is a color arrangement of a mosaic arrangement or a lateral stripe arrangement.

10 Claims, 19 Drawing Sheets

(56) References Cited

FOREIGN PATENT DOCUMENTS

| | | |
|---|---|---|
| JP | 3525995 | 2/2004 |
| JP | 2005-086414 | 3/2005 |
| JP | 2005-208567 | 8/2005 |
| KR | 10-2005-0025935 | 3/2005 |
| WO | WO 97/02709 | 1/1997 |
| WO | WO 2007/031931 A2 | 3/2007 |

OTHER PUBLICATIONS

Saishu, T. et al., "53.3: Distortion Control in a One-Dimensional Integral Imaging Autostereoscopic Display system with Parallel Optical Beam Groups," SID 04 Digest, pp. 1-4, (2004).

* cited by examiner

FIG. 4B

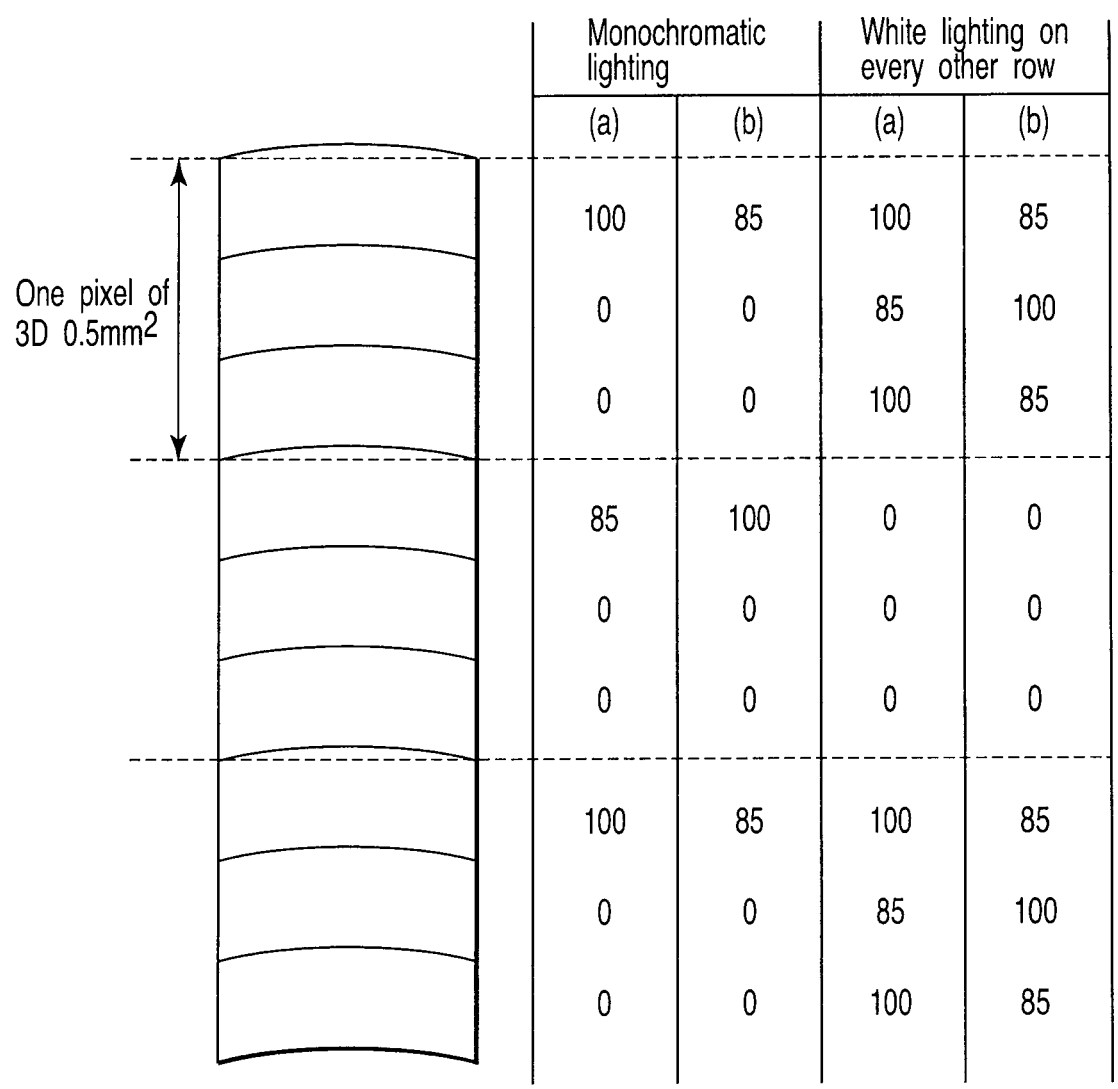
F I G. 9

Coordinate in first direction

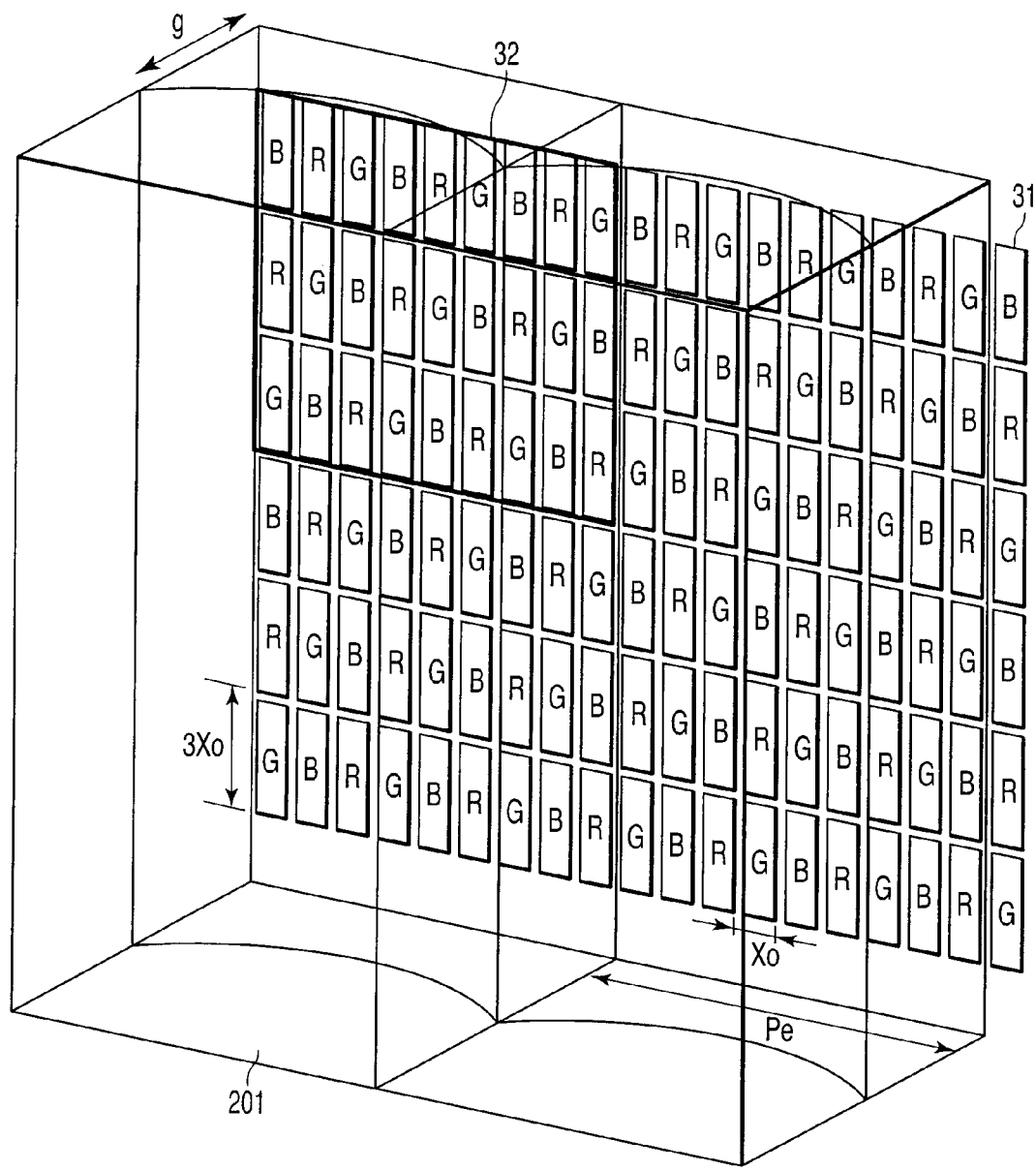
F I G. 21

THREE-DIMENSIONAL IMAGE DISPLAY APPARATUS FOR DISPLAYING THREE-DIMENSIONAL IMAGE

CROSS-REFERENCE TO RELATED APPLICATIONS

This is a Continuation Application of PCT Application No. PCT/JP2008/055185, filed Mar. 14, 2008, which was published under PCT Article 21(2) in English.

This application is based upon and claims the benefit of priority from prior Japanese Patent Application No. 2007-089530, filed Mar. 29, 2007, the entire contents of which are incorporated herein by reference.

BACKGROUND OF THE INVENTION

1. Field of the Invention

The present invention relates to a three-dimensional image display apparatus for displaying a three-dimensional image.

2. Description of the Related Art

As a three-dimensional image display apparatus capable of displaying an animation, i.e., a so-called three-dimensional display, various types are known. In recent years, a system of a flat panel type and requiring no dedicated spectacles or the like is strongly demanded. As a three-dimensional image display apparatus of the type that requires no dedicated spectacles, there is an image display apparatus of a system utilizing the principle of holography. In this system utilizing the principle of holography, displaying a three-dimensional full-color moving picture is considered to be difficult. In contrast to the system utilizing the principle of holography, there is a system in which a light ray control element is set just in front of a display panel (display apparatus) in which pixel positions are fixed like a liquid crystal display apparatus of a direct-view-type or a projection type, or a plasma display apparatus, and light rays from the display panel are controlled to be directed to the observer. According to this system, a three-dimensional full-color moving picture or video can be displayed with relative ease.

The light ray control element is also called a parallax barrier, in which light rays are controlled in such a manner that even when the same position area on the light ray control element is observed, different images can be seen depending on the angle at which the position is observed. More specifically, when only left-right parallax (horizontal parallax) is to be given, a slit or a lenticular sheet (cylindrical lens array) is used as the light ray control element, and when vertical parallax is to be applied in addition to the horizontal parallax, a pinhole array or a lens array is used as the light ray control element.

The system using the parallax barrier is further classified into several types, i.e., a two-eye type, multi-eye type, ultra-multi-eye type (extremely multi-eye type), and integral imaging (hereinafter referred to also as II) type. In the two-eye type, holoscopic vision is realized on the basis of binocular parallax, the three-dimensional image of the multi-eye type and those subsequent thereto are accompanied by movement parallax to a greater or lesser extent, and hence they are called three-dimensional images as distinct from the two-eye type holoscopic image. The fundamental principle for displaying these three-dimensional images is substantially the same as the principle of integral photography (IP) invented about one hundred years ago and applied to the three-dimensional photograph.

Among these systems, the II system has a feature that it is high in the freedom of the eyepoint position, and holoscopic vision is easily enabled. In the one-dimensional II system in which only horizontal parallax is enabled and the vertical parallax is removed, as described in SID04 Digest 1438 (2004), a display apparatus having a high resolution can be realized with relative ease. On the contrary, in the two-eye system or multi-eye system, the resolution can be enhanced easier than the one-dimensional II system by limiting the eyepoint positions at which holoscopic vision is enabled, and a three-dimensional image can be created by only images obtained from the eyepoint position, whereby the load for preparing an image can be lowered. Instead, since the visual field is limited, there is the problem that the viewability is poor.

In such a direct-view-type naked eye three-dimensional display apparatus using a slit or a lenticular sheet, there is the problem that a periodic structure of the opening of the light ray control element in the horizontal direction (first direction) and a periodic structure of a non-display section provided on the flat display device in a matrix form so as to allow the pixels to be separated from each other or a periodic structure of the color arrangement of the pixels in the horizontal direction (first direction) optically interfere with each other, whereby moire fringes or color moire are liable to occur. As the measures for this, a method is known in which the periodicity of the light ray control element is slanted, i.e., the lens is slanted. In this method, however, straight lines extending in the vertical and horizontal directions are displayed in a jagged form, and hence, particularly, there is a problem that the text display quality is poor. In a vertical lens in which a lens characteristic is not provided in the vertical direction (second direction), and the periodicity is limited to the horizontal direction, although the text display quality does not become a problem, in order to resolve the color moire, the color arrangement of the flat display device must be a mosaic arrangement or a lateral stripe arrangement. Furthermore, in order to resolve the problem of the moire caused by the interference of the periodic structure of the opening area 1 of the light ray control element in the horizontal direction with the periodic structure of a non-display section provided on the flat display device in a matrix form so as to allow the pixels to be separated from each other, as disclosed in JPA No. 2005-86414(KOKAI), by interposing a diffusion film or the like between the flat display device and the lenticular sheet, light rays from sub-pixels adjacent to each other in the horizontal direction are merged into each other, thereby removing the periodicity in the horizontal direction and resolving the problem of the moire. However, when the diffusion film is added, a problem occurs that external light is dispersed and the contrast in a lighted environment is lowered.

As methods other than the method of using the diffusion film for appropriately merging the light rays from sub-pixels adjacent to each other into each other, a method in which the arrangement of the sub-pixels is a delta arrangement as disclosed in JP3027506, a method in which an opening part of a sub-pixel is formed into a parallelogram so as to allow pixels adjacent to each other in the horizontal direction overlap with each other on a coordinate in the horizontal direction as disclosed in WO97/02709, and a method in which a total value of opening area lengths of sub-pixels in the vertical direction (second direction) is not varied in the horizontal direction as disclosed in JP3525995 are known. However, in a design conforming to JP3027506, it is necessary to provide a gate line continuous in the vertical direction, and hence there is a problem that the numerical aperture is equal to 50% or lower. Further, as disclosed in WO97/02709, if sub-pixels are arranged such that the barycenter of each of them is not shifted in the vertical and horizontal directions while the opening area shape is formed into a parallelogram, there is a problem that it becomes difficult to arrange a signal line to be normally provided continuously in the vertical direction.

Further, in order to realize a simple opening area shape shown in JP3525995, there occurs a need to additionally provide a the light shielding section 3 in addition to light shielding elements such as thin-film transistors (TFTs) and Cs lines provided locally in each of sub-pixels 10 of the LCD.

As described above, in the conventional three-dimensional image display apparatus, in which the light ray control element having the periodicity limited in the horizontal direction (first direction) and the flat display device having pixels arranged in a matrix form are combined with each other, the periodicity of the light ray control element in the first direction and the periodicity of the flat display device in the horizontal direction interfere with each other, and unevenness in brightness (moire) is caused. As a method for resolving the problem of the moire, there is a method in which the opening area length in the second direction (vertical direction) is made constant, and the opening area length in the second direction is made not to vary in the first direction, i.e., the periodicity of the opening area length in the second direction is eliminated. If it is attempted to satisfy this condition while providing the structure in which coordinate points in the first direction having TFTs, Cs lines, and shielding of poor orientation of liquid crystals are locally present, dummy the light shielding sections which are normally unnecessary must be provided such that the opening area length in the second direction becomes constant in the first direction in addition to the light shielding sections which are originally necessary, thereby posing a problem that the numerical aperture is lowered.

BRIEF SUMMARY OF THE INVENTION

According to an apparatus for displaying a three-dimensional image, comprising:

a display section configured to display a flat image, which includes arrangements of sub-pixels, each of the arrangement of sub-pixels being arranged in a first direction, and the arrangements of sub-pixels being arranged in a second direction to form a matrix, wherein each of the sub-pixels have an opening area and a the light shielding area, the area of the opening area is obtained by subtracting an area of the light shielding area from the area of the sub-pixel, and is defined by a value obtained by integrating opening area lengths in the second direction into the first direction, the opening area length in the second direction in one of the arrangements of sub-pixel varies in the first direction, and a sum of the one of the opening area length and another one of the opening area length in the second direction in another one of the arrangements of sub-pixel are made substantially constant in the first direction; and a light ray control element configured to control light rays from the sub-pixels of the display section, which is faced to the display section and is provided with a large number of optical openings extending substantially linearly in the second direction and arranged in the first direction.

BRIEF DESCRIPTION OF THE SEVERAL VIEWS OF THE DRAWING

FIG. 4B is a graph showing the state of variation in a light shielding length of a sub-pixel in the flat image display section shown in FIG. 3 for each first arrangement.

FIG. 9 is an explanatory view for explaining a luminance difference resulting from an image displayed on the display section shown in FIG. 7 and an opening area shape.

FIG. 21 is a perspective view schematically showing the configuration of a part of the three-dimensional image display apparatus shown in FIG. 18.

DETAILED DESCRIPTION OF THE INVENTION

A three-dimensional image display apparatus according to an embodiment of the present invention will be described below in detail with referring to the accompanying drawings.

Figure 1:
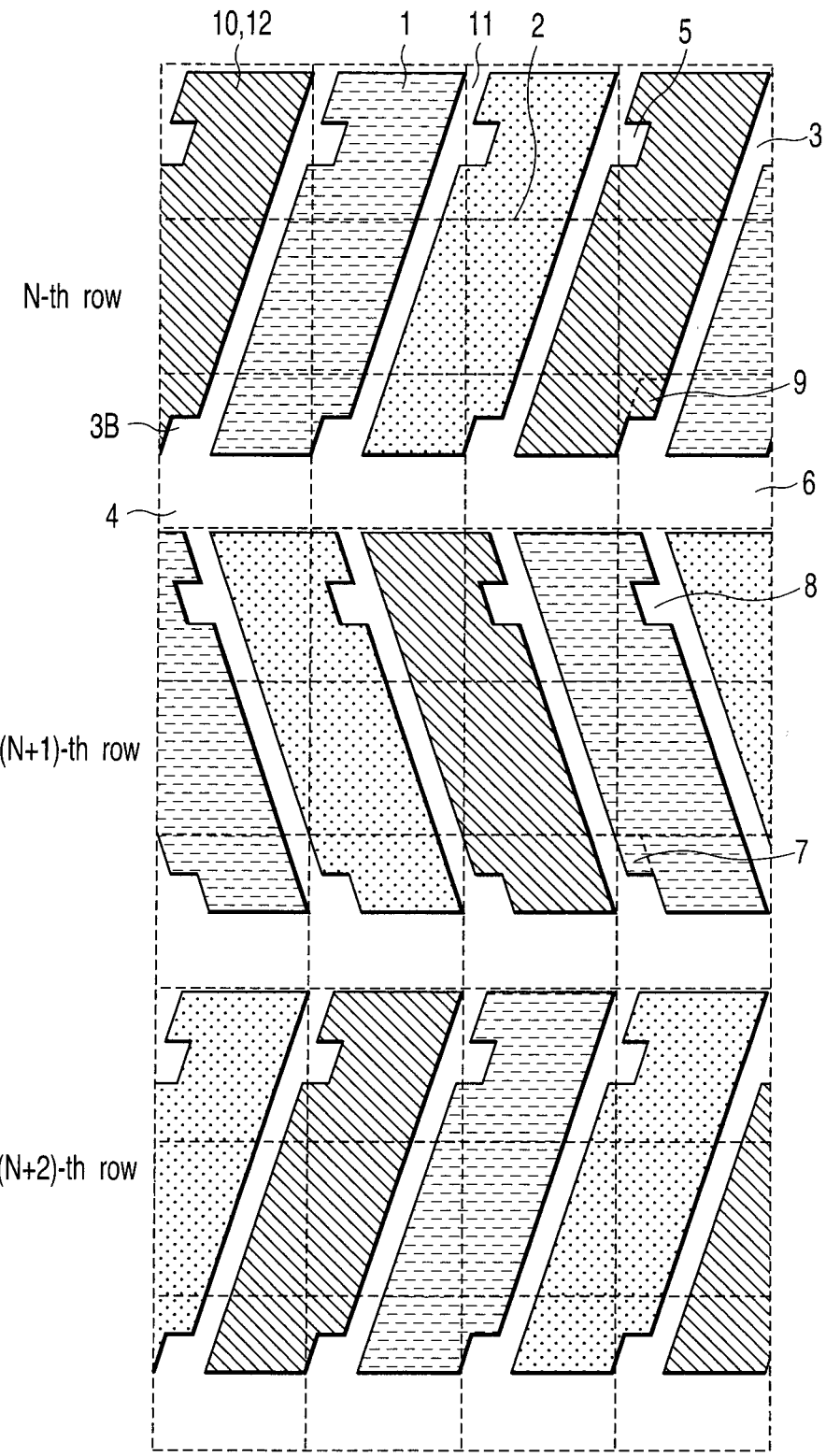
FIG. 1 is an enlarged view showing a part of a display section for displaying a flat image, in an enlarging manner, the display section constituting a three-dimensional image display apparatus according to an embodiment of the present invention.

FIG. 1 is an enlarged view schematically showing a part of a display section for displaying a flat image in the three-dimensional image display apparatus according to the embodiment of the present invention in an enlarging manner.

This display section is constituted of sub-pixels 10 arranged in a matrix form in the horizontal and vertical directions, and a color filter segment 12 is provided in front of the sub-pixel 10. Further, the sub-pixel 10 is constituted of light shielding sections or shielding areas 3 and 6, and picture elements partitioned by the light shielding sections 3 and 6, and an opening area or part 1 is determined by the partitioned picture element and the color filter segment 12 corresponding to the sub-pixel 10. White light emitted from a backlight (not shown) is transmitted from the opening area 1 through the color filter segment 12, whereby a part in front of the display section is irradiated with light rays of one of RGB colors, and a image is displayed on the display section in accordance with the light intensity and color of the light passing through the opening area 1 of the sub-pixel 10.

The opening area 1 of the sub-pixel 10 is formed, as shown in FIG. 1 as an example, into a substantially parallelogram shape partly chipped by the light shielding section or shielding area 5 and 3B. A color-arranged color filter segment 12 is arranged on the sub-pixel 10 as shown in FIG. 1. A horizontal direction in FIG. 1 corresponds to a first direction, and a vertical direction corresponds to a second direction. In FIG. 1, a region constituted of three rows/four columns sub-pixel 10 is shown in FIG. 1, and additional lines 2 are drawn as squares for convenience of explanation. Further, in FIG. 1, a shaded part corresponds to the opening area 1, and a void part corresponds to a black matrix. Here, the same shaded pattern corresponds to an opening area 1 constituted of a color filter segment having the same color and length.

Figure 2A:
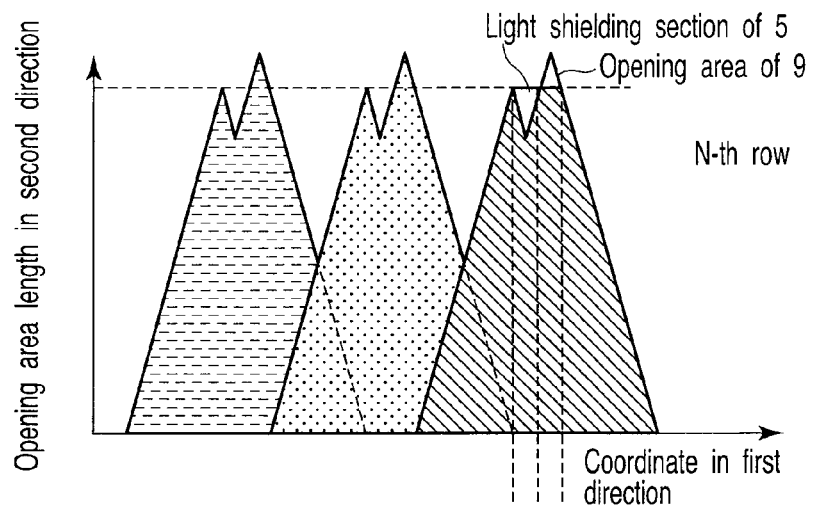
FIG. 2A is a graph showing that an opening area length of a sub-pixel in a second direction (vertical direction) in a flat image display section shown in FIG. 1 has dependence on the coordinate in the first direction (horizontal direction).
Figure 2B:
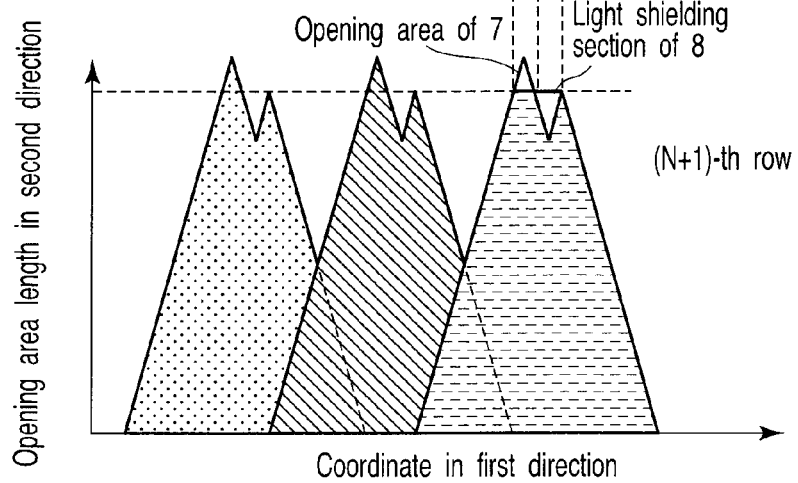
FIG. 2B is a graph showing that an opening area length of a sub-pixel in a second direction (vertical direction) in the flat image display section shown in FIG. 1 has dependence on the coordinate in the first direction (horizontal direction).

In a general pixel arrangement, vertical wiring (signal line wiring) is continuously and linearly provided in the second (vertical) direction. In the pixel arrangement shown in FIG. 1, the light shielding section 3 corresponding to the vertical wiring is slanted. By inclining the light shielding section 3 as described above, the opening area lengths of the opening areas 1 in the second direction (vertical direction) can be made substantially constant in the first direction (horizontal direction) as shown in FIGS. 2A and 2B. Further, opening areas 1 having the same shape and the same size are arranged in the first direction (horizontal direction) at regular pitches with the light shielding section 3 interposed between them. Here a numerical aperture is defined as a ratio of an area S2 of the opening area 1 to a sum (S1+S2) of an area S1 obtained by adding areas 3, 3B, 5, and 6 of the light shielding sections defining one sub-pixel 10 together and an area S2 of the opening area 1. The shielding sections 3 and 6 also contribute to an opening area 1 of the adjacent sub-pixel 10, and hence a certain proportion of the area of the light shielding sections 3 and 6 surrounding a certain opening area 1 corresponds to the area S1 of the light shielding sections, and the remaining part of the light shielding sections 3 and 6 corresponds to an area S1 of the light shielding sections of the other sub-pixels adjacent to the opening area 1 on the right and left, and above and below. Further, a value obtained as a result of adding up the length of the opening area 1 in the second direction (vertical direction) in the first direction (horizontal direction) over the width of the sub-pixel 10 corresponds to the area S2 of the opening area 1, and a value obtained as a result of adding up the lengths of the shielding sections 3, 3B, 5, and 6 in the second direction (vertical direction) in the first direction (horizontal direction) over the width of the sub-pixel 10 corresponds to the area S1 of the light shielding section 3.

In the arrangement shown in FIG. 1, the directions of inclination of the light shielding section 3 are identical in the even rows and in the odd rows. However, the even rows and odd rows are determined in the opposite ways. Accordingly, as shown in FIG. 1, the light shielding section 3 is bent by the lateral wiring 6 for separating the opening areas 1 into respective rows and corresponding to the light shielding section 3, and the vertical wiring 11 corresponding to the light shielding section 3 is continuously extended substantially in the second direction (vertical direction) so as to be meandered as a whole. In FIG. 1, an example in which the direction of inclination of the vertical wiring 11 is reversed for each row is shown for explanation simplicity's sake. However, if the opening area centers of the sub-pixel 10 are aligned in both the first and second directions, the vertical wiring 11 may be bent an odd number of times in the same row. For example, when the vertical wiring 11 is bent once, one shape of the sub-pixel 10 may be formed into a "doglegged shape (L shape)".

Figure 2C:
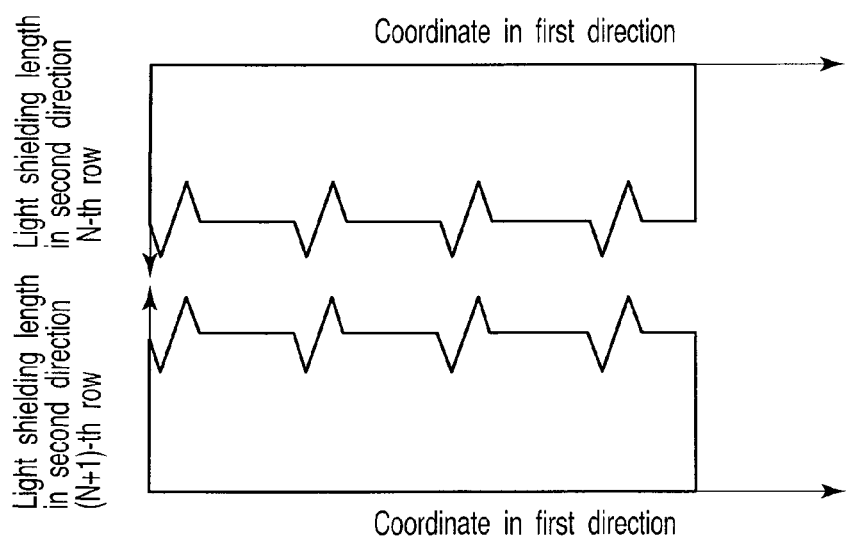
FIG. 2C is a graph showing the state of variation in a light shielding length of the sub-pixel 10 in the flat image display section shown in FIG. 1 for each first arrangement.

In the display section shown in FIG. 1, as shown in FIGS. 2A to 2C, the opening area length of the sub-pixel 10 of the (N+1)th row adjacent to the sub-pixel 10 of the first arrangement of the Nth row in the second direction (vertical direction) cancels out the variation in the opening area length of the sub-pixel 10 of the first arrangement of the Nth row, and the sum of the opening area lengths of the first arrangements of two rows adjacent to each other in the second direction is made constant.

Figure 3:
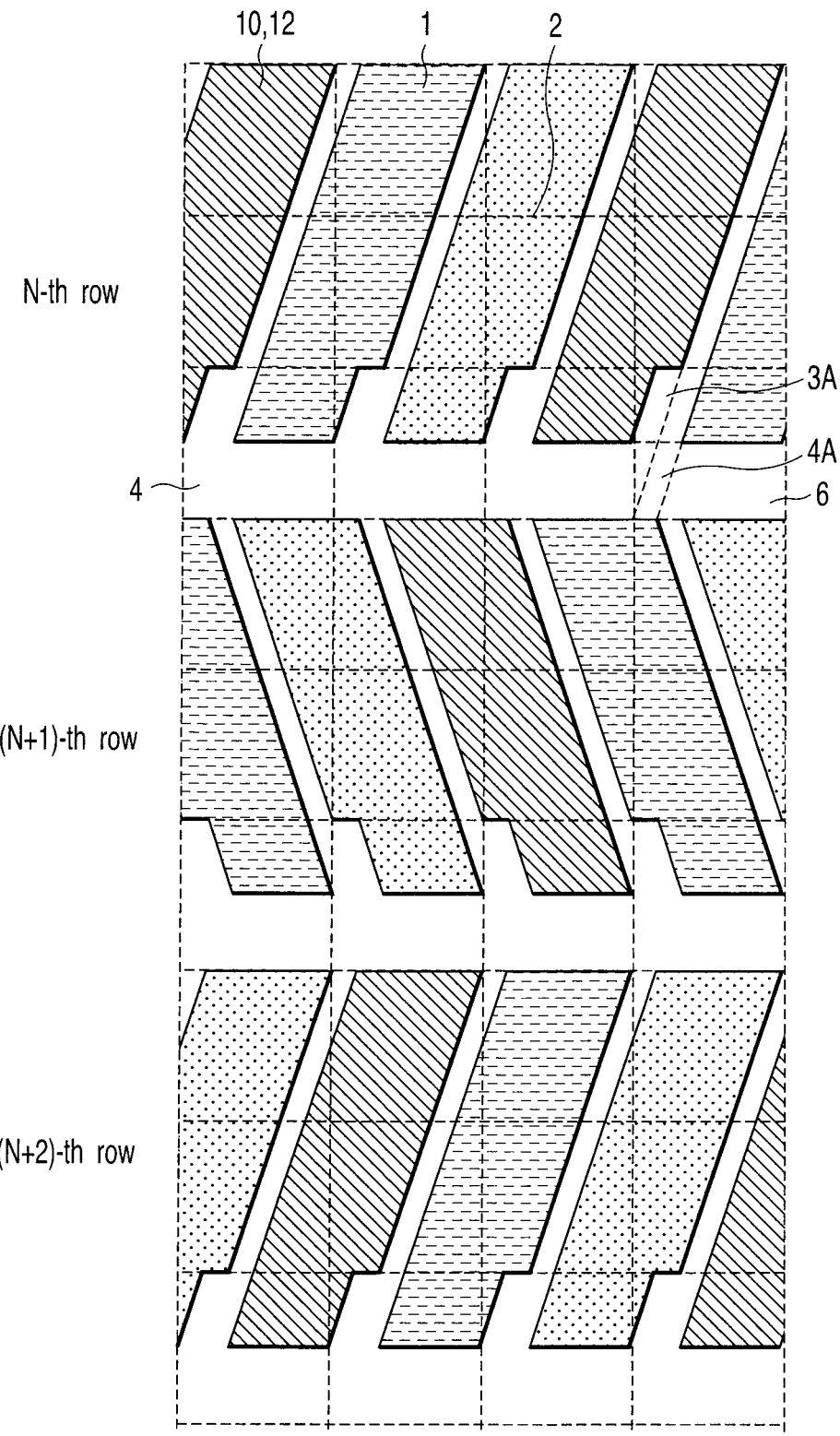
FIG. 3 is an enlarged view of a part of a flat image display section constituting a three-dimensional image display apparatus according to a comparative example.

To explain the effect of enabling the variation in the opening area length in the first direction shown in the display section shown in FIG. 1 and shown in FIGS. 2A to 2C to be canceled out, a description will be given below by referring to FIGS. 3 and 4A to 4C. FIG. 3 shows an opening area shape of the display section as a comparative example, and FIGS. 4A to 4C show distribution of the opening area length and light shielding length in the opening area shape of the display section shown in FIG. 3.

As shown in FIG. 1, the sub-pixel 10 has a substantially parallelogram shape. Likewise, the sub-pixel 10 also has a substantially parallelogram shape in the display section shown in FIG. 3 according to the comparative example. In order to make the opening area length in the second direction (vertical direction) of the first arrangement completely constant in the sub-pixel 10 having the substantially parallelogram shape, it is necessary to provide a the light shielding section 3A at an intersection section 4A of the lateral wiring 6 extended in the first direction (horizontal direction) and the vertical wiring 11 extended substantially in the second (vertical) direction. Here, the area of the light shielding section 3A is determined so as to be equal to the area of the intersection section 4A. By providing this the light shielding section 3A, the sum of the opening area lengths of the sub-pixel 10 belonging to the first arrangement in the second direction (vertical direction) becomes constant only in the first arrangement.

Figure 4A:
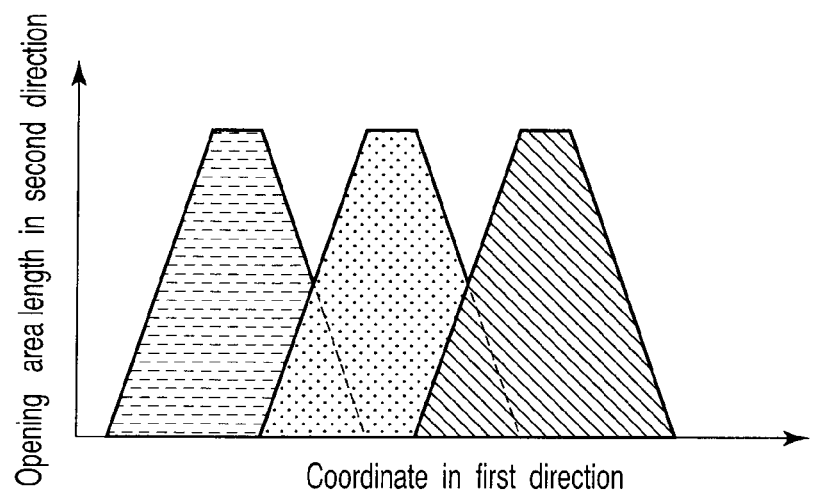
FIG. 4A is a graph showing the dependence of an opening area length of a sub-pixel in a second direction (vertical direction) of the flat image display section shown in FIG. 3 on a first coordinate.
Figure 4C:
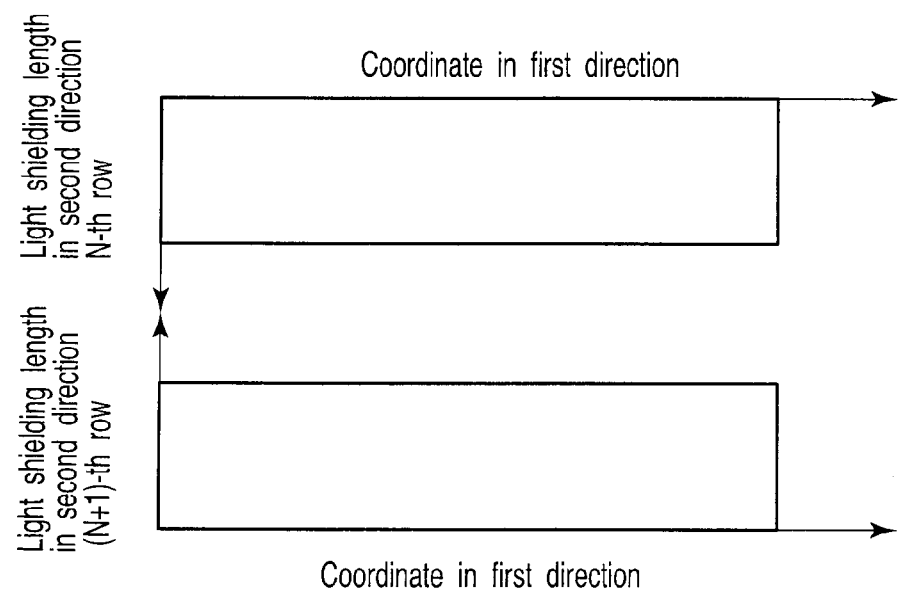
FIG. 4C is a graph showing the state of variation in a light shielding length of a sub-pixel in the flat image display section shown in FIG. 3 for each first arrangement.

In FIG. 4A, a graph in which the variation in the opening area length of the sub-pixel 10 in the second direction (vertical direction) is shown on the ordinate, and the coordinate in the first direction (horizontal direction) is shown on the abscissa, is shown. Further, in each of FIGS. 4B and 4C, the sum of the light shielding lengths for each row is shown. It is understood that the light shielding length is constant in both the Nth sub-pixel 10 and the (N+1)th sub-pixel. Here, the light shielding length is defined as a value obtained by subtracting the opening area length from the height (length) of the sub-pixel 10 in the second direction (vertical direction). (i.e., light shielding length=(height of sub-pixel 10 in second direction (vertical direction))−opening area length of sub-pixel 10 in second direction (vertical direction)).

That is, a sub-pixel 10 in the Nth row has a certain opening area shape, and the opening area length of the opening area shape in the second direction (vertical direction) corresponds to the height of the opening area 1 of the sub-pixel 10 in the second direction (vertical direction). In other words, the opening area 1 is substantially parallelogram, and hence the height is increased with an increase in the coordinate in the first direction (horizontal direction) corresponding to one side of the parallelogram. In the display section shown in FIG. 3, the light shielding section 3A is provided, and hence the opening area length in the second direction (vertical direction) becomes a substantially constant height between the light shielding section 3A and the oblique side of the parallelogram. Subsequently, the opening area length becomes a substantially constant height between the top side of the light shielding section and the top side of the parallelogram, and thereafter, the height is decreased with an increase in the coordinate in the first direction (horizontal direction). In the adjacent sub-pixel 10 too, the opening area length in the second direction (vertical direction) is varied as shown in FIG. 4A. In other words, the light shielding section 3A is provided in such a manner that the total value of the light shielding length of the sub-pixel belonging to the first arrangement of the Nth row in the second direction (vertical direction) is substantially constant as shown in FIG. 4B. Likewise, the light shielding section 3A is provided in such a manner that the total value of the light shielding length of the sub-pixel belonging to the first arrangement of the (N+1)th row in the second direction (vertical direction) is substantially constant as shown in FIG. 4C.

Incidentally, the area of the light shielding section 3 in which TFT elements, through-holes, a structure for hiding orientation abnormality of the liquid crystal caused by a spacer for maintaining the cell gap, and the like locally exist in the first direction (horizontal direction) is not always equivalent to the area of the intersection section 4A of the wiring. As described previously, when the area of the light shielding section 3A is larger or smaller than the area of the intersection section 4A, the opening area length of the sub-pixel 10 in the second direction (vertical direction) does not become constant in the row arranged in the first direction (horizontal direction). In contrast to this comparative example, in the display section shown in FIG. 1, the opening area length of the sub-pixel 10 of the (N+1)th row adjacent to the Nth row in the second direction (vertical direction) cancels out the variation in the opening area length of the sub-pixel 10 of the Nth row in the second direction (vertical direction), and the sum of the opening area lengths of two rows in the second direction is made constant. For example, as is evident from the comparison with FIG. 3 as the comparative example, a the light shielding section 5 is provided in the first arrangement of the Nth row as shown in FIG. 1, along with the provision of the light shielding section 5, region 7 in the first arrangement of the (N+1)th row which is symmetrical to the first arrangement of the Nth row with the lateral wiring (gate line in many cases) 6 being the symmetry axis, is changed from the region of the light shielding section 3B to the region of the opening area 1. Region 7 of the opening is provided with substantially the same area as the light shielding section 5. On the other hand, along with the provision of a the light shielding section 8 in the first arrangement of the (N+1)th row, region 9 in the first arrangement of the Nth row is changed from the region of the light shielding section 3B to the region of the opening area 1. The area of the light shielding section 8 is also made equal to the area of region 9.

In each of FIGS. 2A and 2B, a graph in which an opening area length of each of the sub-pixels in the second direction (vertical direction) is taken on the ordinate, and the coordinate in the first direction (horizontal direction) is taken on the abscissa is shown. Each of FIGS. 2A and 2B shows an opening area length in the first arrangement of each of two rows (Nth row and (N+1)th row) adjacent to each other in the vertical direction in the flat display section. The shaded pattern in each of FIGS. 2A and 2B implies the color component of the opening area 1 as in FIG. 1. FIG. 2C shows the sum of the light shielding lengths for each first arrangement. To make it easy to see whether or not the sum of the light shielding lengths (=opening area lengths) becomes constant, the axes of the light shielding length in the first arrangements of the Nth and (N+1)th rows are inverted in the illustration. By designing the opening area 1 as shown in FIG. 1, it is possible to vary the light shielding length in the first arrangement of the (N+1)th row so as to cancel out the variation in the light shielding length (=(height of sub-pixel 10 in second direction (vertical direction))–opening area length) in the first arrangement of the Nth row. More specifically, although the opening area length in the second direction (vertical direction) varies only in the first arrangement, the sum of the opening area lengths of the sub-pixels 10 in the first arrangements of a plurality of rows in the second direction (vertical direction) becomes constant. Furthermore, as shown in FIG. 2A, the area of the opening area 1 of each sub-pixel 10 is constant.

More specifically, a certain sub-pixel 10 in the first arrangement of the Nth row has a certain opening area shape, and the opening area length of the opening area shape in the second direction (vertical direction) corresponds to the height of the opening area 1 of the sub-pixel 10 in the second direction (vertical direction) as shown in FIG. 2A. That is, the opening area 1 of the Nth row is substantially parallelogram, and hence the height (opening area length) is increased with an increase in the coordinate in the first direction (horizontal direction) corresponding to one side of the parallelogram, the height reaches a first peak between the base of the parallelogram and the light shielding section provided on one oblique side thereof, and is then decreased. With an increase in the coordinate in the first direction (horizontal direction), the height is again increased, reaches a second peak, and is then decreased.

On the contrary, in the opening area 1 in the first arrangement of the (N+1)th row, the height (opening area length) is increased with an increase in the coordinate in the first direction (horizontal direction) corresponding to one side of the parallelogram, the height reaches a second peak between the base of the parallelogram and the light shielding section 3B, and is then decreased. With an increase in the coordinate in the first direction (horizontal direction), the height is again increased, reaches a first peak lower than the second peak, and is then decreased.

In this case, the light shielding length in this second direction (vertical direction) in the first arrangement of the Nth row does not become constant as shown inn FIG. 2C, and a peak resulting from the first and second peaks appears. Likewise, the light shielding length in the first arrangement of the (N+1)th row in the second direction (vertical direction) does not also become constant as shown in FIG. 4B, and a peak resulting from the first and second peaks appears.

As is evident from the comparison between FIGS. 2A and 2B, the first peak of the Nth row and the first peak of the (N+1)th row are complementary to each other in such a manner that the first peak of the Nth row compensates a dip caused between the first and second peaks of the (N+1)th row, and the first peak of the (N+1)th row compensates a dip caused between the first and second peaks of the Nth row. Further, the light shielding length in the second direction (vertical direction) in the first arrangement of the Nth row shown in FIG. 2C and the light shielding length in the second direction (vertical direction) in the first arrangement of the (N+1)th row are complementary to each other, and the total value of the opening area lengths in the first arrangements of the Nth and (N+1)th rows in the second direction (vertical direction) becomes constant.

According to the display section shown in FIG. 1, the opening area lengths of the nth and (N+1)th rows can be made complementary to each other as shown in FIGS. 2A and 2B, and likewise, the light shielding lengths in the first arrangements of the Nth and (N+1)th rows can also be made complementary to each other as shown in FIG. 2C.

Although the way explained with reference to FIG. 1 in which the light shielding section 5 and 8 are provided is different from the way of the actual pixel design, it should be noted that FIG. 1 is drawn for the purpose of explaining the concept of the design for the shape of the actual opening area. In the actual design, the design is performed in such a manner that the coordinate of the light shielding section 3 in the first direction is shifted due to TFT elements and the like which would be unevenly distributed in the sub-pixel 10, which is canceled in the adjacent two rows or in more rows. Further, in the display section shown in FIG. 1, a mosaic arrangement is employed as the color filter arrangement, to thereby suppress an occurrence of the color moire.

Figure 7:
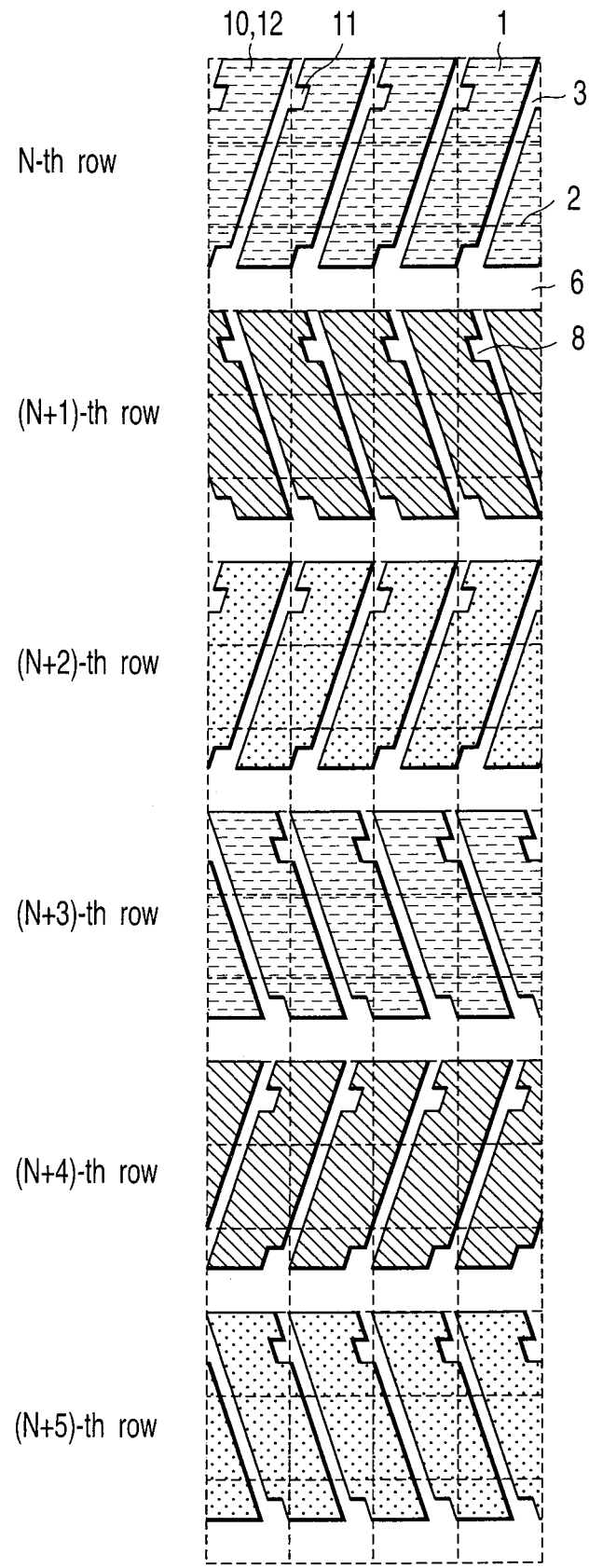
FIG. 7 is an enlarged view showing a part of a flat image display section, in an enlarging manner, the display section constituting a three-dimensional image display apparatus according to another embodiment of the present invention.
Figure 8:
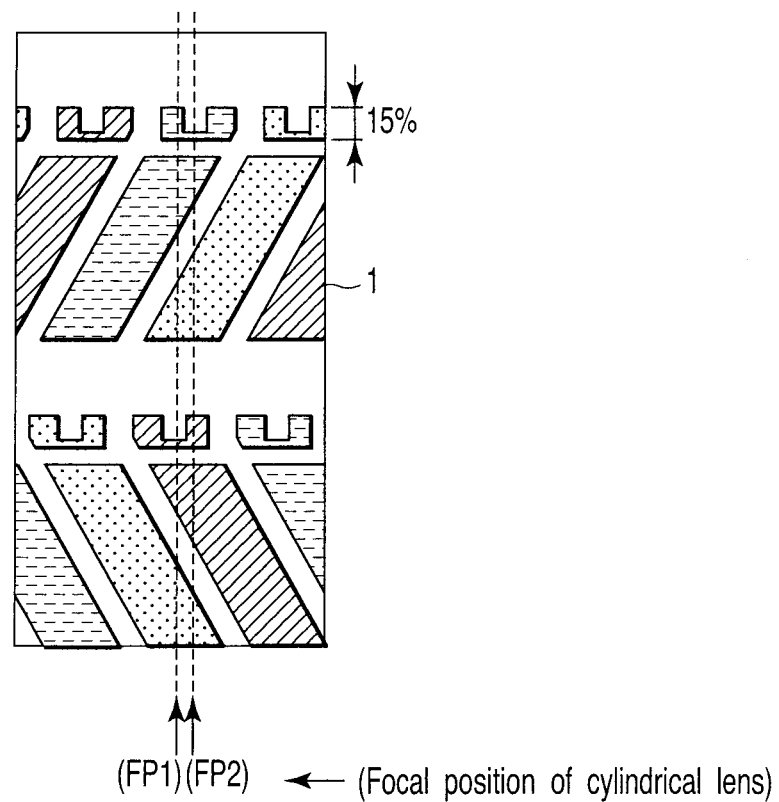
FIG. 8 is an explanatory view showing a relationship between an opening area shape in the display section shown in FIG. 7 and a focal position.

FIG. 7 shows a part of a flat image display section of a three-dimensional image display apparatus according to still another embodiment of the present invention in an enlarging manner. As shown in FIG. 7, the shape of the opening area according to this embodiment is the same as the shape of the opening area of the sub-pixel shown in FIG. 1, and differs from the structure shown in FIG. 1 in the point that the color arrangement is a lateral stripe color arrangement. Even by using the lateral stripe color arrangement, the color moire can be prevented from occurring at the time of three-dimensional display.

Figure 5:
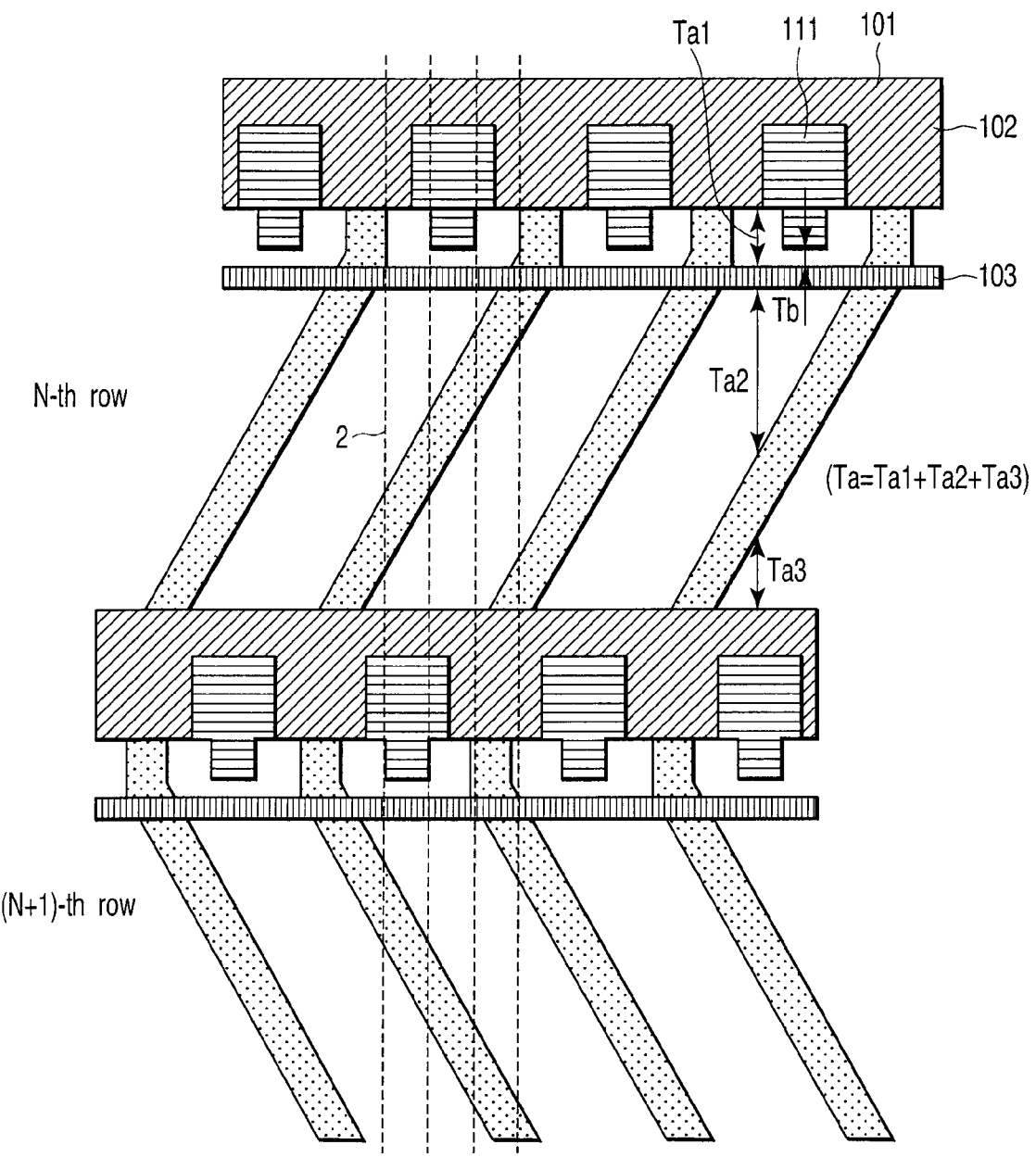
FIG. 5 is an enlarged view showing a part of a display section for displaying a flat image, in an enlarging manner, the display section constituting a three-dimensional image display apparatus according to another embodiment of the present invention.
Figure 6A:
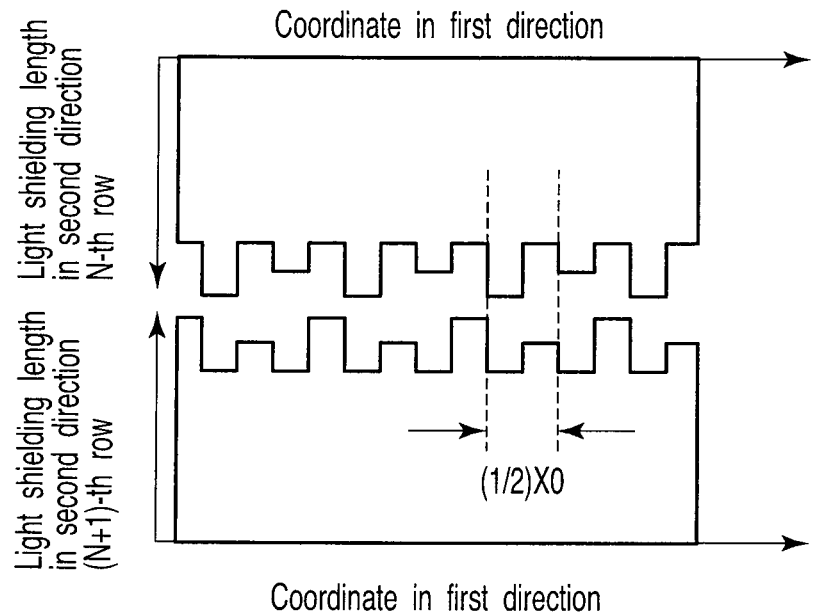
FIG. 6A is a graph showing the state of variation in a light shielding length of a sub-pixel in the display section shown in FIG. 5 for each first arrangement (Nth row and (N+1)th row).
Figure 6B:
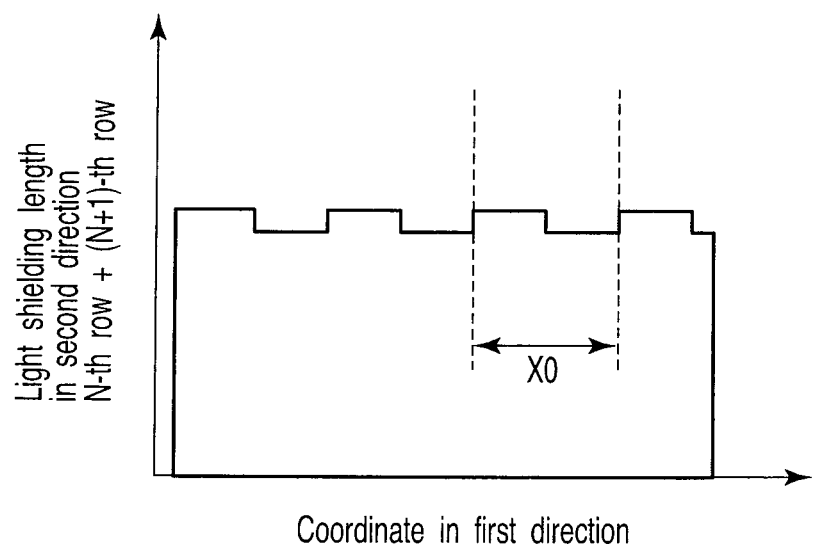
FIG. 6B is a graph showing the state of variation in a light shielding length of a sub-pixel in the display section shown in FIG. 5 for each first arrangement (Nth row+(N+1)th row).

In FIG. 5, a drawing similar to the actual structure is shown. As the main structures for lowering the numerical aperture, there are the wiring 101 to 103, and the structure 111. As the structure for lowering the numerical aperture, there are minute structures besides the above, but they are simplified in FIG. 5. The wiring 101 is bent zigzag at each row, the coordinate of the intersection section of the wiring 101 and the wiring 102 in the first direction, and the structure 111 are, as is evident by referring to the reference line 2, shifted in the first direction to be set up. By virtue of such an arrangement, the variation in the light shielding length in the first arrangement of the Nth row and the first arrangement of the (N+1)th row shown in FIG. 6A can be canceled out in two adjacent rows as shown in FIG. 6B. Here, in the arrangement shown in FIG. 5, the structure 111 and the wiring 103 are separated from each other for the purpose of insulation. In the row adjacent to the opening area between the structure 111 and the wiring 103, there is no structure for realizing a light shielding length for canceling out the opening area length. This is because the opening area is minute, and the opening area length Tb thereof is small as compared with the opening area length Ta in the second direction. To what degree the opening area length Tb should be restricted will be described below. Restricting the size of the opening area between the structure 111 and the wiring 103 to a small value does not hinder the design for making the opening area length constant in two rows adjacent to each other.

Figure 10:
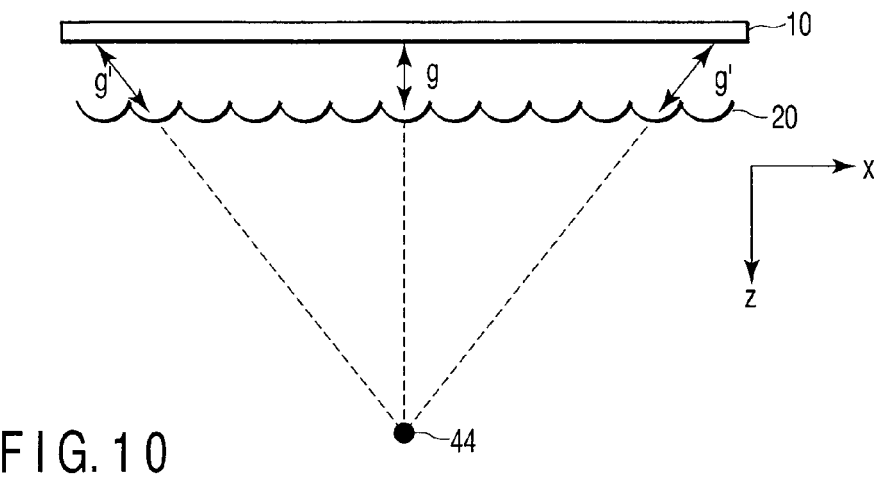
FIG. 10 is an explanatory view showing a relationship between a viewing angle determined by using a visual point in the three-dimensional display apparatus as a reference and a lens-pixel distance.
Figure 11:
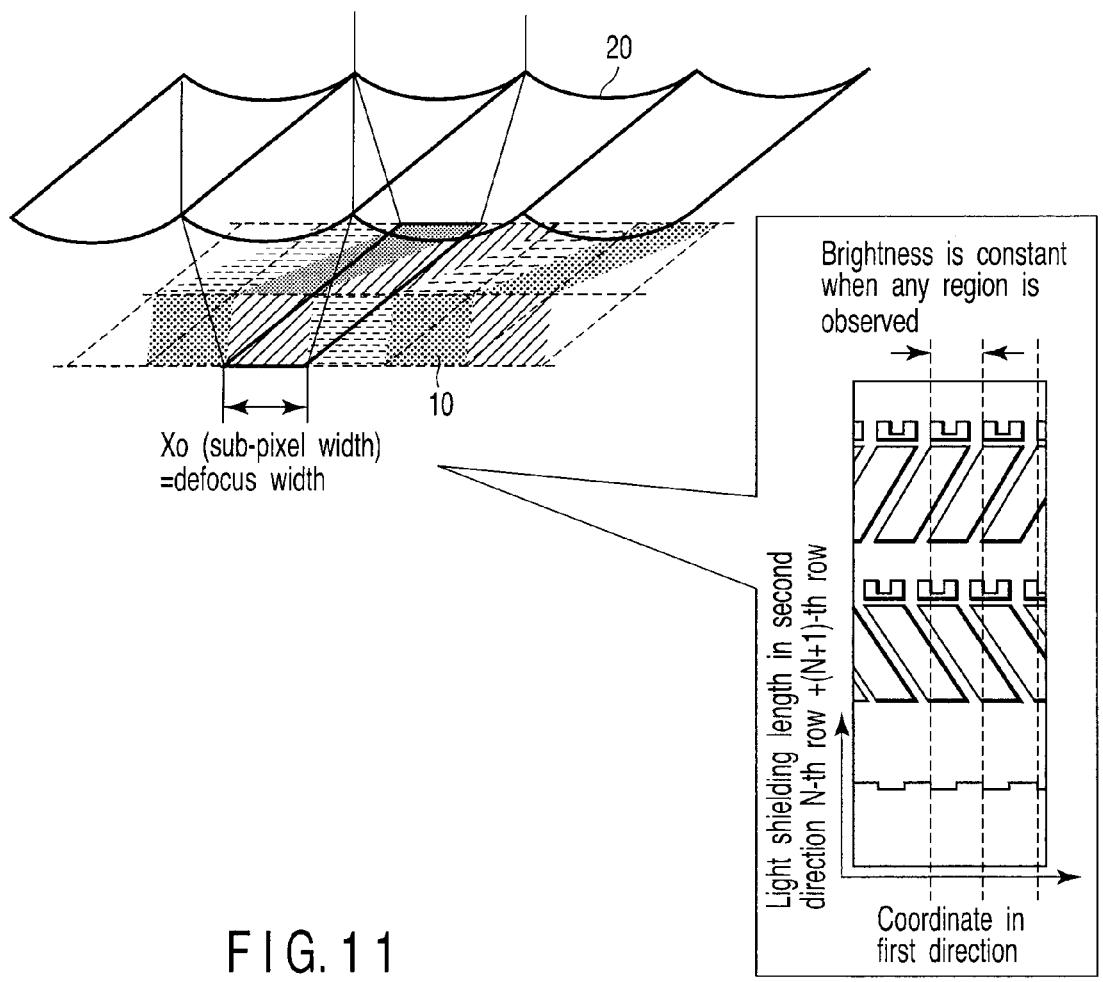
FIG. 11 is an explanatory view showing a qualitative relationship between a lens and a sub-pixel shape which are in a defocused relationship in the display apparatus shown in FIG. 10.

A case where a lenticular sheet is used as the light ray control element will be described below as an example. When a lenticular sheet 20 is used, design is performed in such a manner that a substantially uniform defocus can be obtained on the entire surface in consideration of the fact that the distance between the vertex of the lens and a pixel section of the display 10 varies in accordance with a change in the horizontal observation angle based on a visual point 44 over the entire surface of the display 10 as shown in FIG. 10. More specifically, by designing the gap between the lens vertex and the display pixel section a little shorter than the focal distance (f), i.e., by making the defocus horizontal width to be about 50% of the sub-pixel width as shown in FIG. 11, defocus (g<f)

occurs on the diplay front part due to the fact that the gap is shorter than the focal distance, defocus occurs at the fringe part of the display due to the fact that the gap is longer than the focal distance (f<g') or due to various aberrations and curvature of field, and the defocus amount can be made substantially constant without being adversely affected by the change in the observation angle. In other words, when it is aimed at making the defocus amount constant over the entire surface of the display in consideration of various defocus factors, the obtained defocus width is at least about 50% of the horizontal width of the sub-pixel. On the other hand, if the period of the variation in the sum of the opening area lengths of the sub-pixels of two rows is equal to the sub-pixel width as shown in FIG. 6B, the contrast of the brightness variation incident to the variation in the vertical opening area length theoretically becomes zero by observing it through a lenticular sheet in which the horizontal defocus width coincides with the pixel width (Xo).

Figure 12:
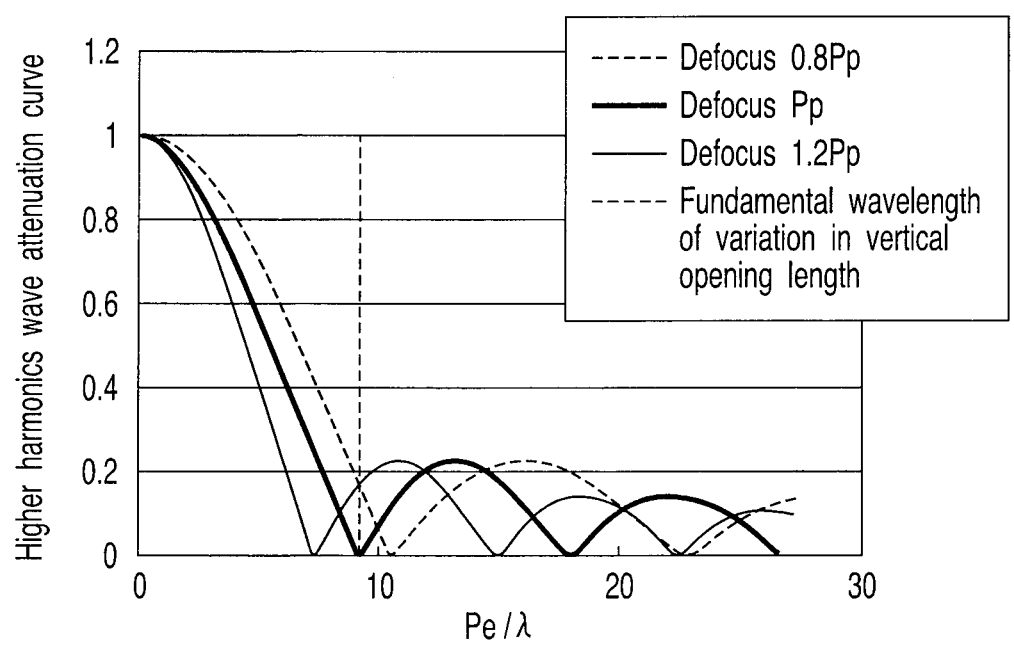
FIG. 12 is a graph showing a higher harmonics wave attenuation curve (MTF) obtained by observing a variation in a vertical opening area length of a ½ wavelength of a sub-pixel width through a lenticular lens in which a parallax number 9 and a defocus horizontal width are 40 to 60% of a sub-pixel width.

The reason for this will be described below by using the MTF theory. When a wave of a short period (wavelength ($\lambda$)) of the variation in the vertical opening area length is sampled by a defocused lens, the brightness variation is not correctly reproduced. The contrast deterioration of the brightness variation is dependent on the width of the defocus. For example, when the minimum horizontal defocus width is just equal to the horizontal width (Xo) of the sub-pixel, if the variation ($\lambda$) in the vertical opening area length in FIG. 6B is seen through a lens, it becomes just one period wherever it is seen, and the contrast observed through a lens becomes zero. This will be described below by using the MTF curve shown in FIG. 12. When a wave of the variation in the vertical opening area length of a wavelength ($\lambda$=Xo) of the sub-pixel width (Xo) is sampled by using a 9-parallax lens (Pe (horizontal width)=9Xo), it corresponds to Pe/$\lambda$(abscissa in FIG. 12)=9Xo/Xo=9. When the horizontal defocus width of the lens=Xo, the MTF curve is zero due to Pe/$\lambda$=9. That is, it expresses that the contrast becomes zero. Even if the defocus amount varies from 0.8Xo to 1.2Xo due to the manufacturing error, when the fundamental wavelength ($\lambda$) is equal to or less than 1/8 of the horizontal width (Pe) of the lens, the brightness difference of the variation in the vertical opening area length is estimated to be held down to about 20% of the original contrast. Here, a case where sampling is performed by using a 9-parallax lens (Pe (horizontal width)=9Xo) is introduced above as an example. When the defocus width is set to a value equal to the fundamental wavelength ($\lambda$) of the variation in the vertical opening area length or a value of an integral multiple thereof, and the manufacture error of the defocus width is taken into consideration, the contrast of the variation in the vertical opening area length observed through the lens becomes 20% of the original contrast. Accordingly, when it is assumed that a visual confirmation limit of a human being is a contrast ratio of 0.5%, and the patience limit is 2%, brightness variation of 2.5 to 10% which is five times as large as the above values is allowed. In other words, it is sufficient if the variation in the vertical opening area length obtained by adding a plurality of opening area lengths is held down to 10% or less.

Further, in the above-mentioned structure in which the variation in the light shielding length in the first arrangements of two rows adjacent to each other in the second direction is made constant, there exists a killer pattern. In a killer pattern, such as a monochromatic display, or a white display on every other row, the canceling effect in the first arrangements of two rows (Nth row and (N+1)th row) adjacent to each other in the vertical direction is lost. First, in the case of monochromatic display, lighting is performed on every third row in the first arrangement as shown in FIG. 9, and hence the sum of the opening area lengths becomes constant in six rows as shown in FIG. 9. For example, when it is assumed that the height (height of the first arrangement) of the sub-pixel is 150 $\mu$m, it means that the brightness becomes constant by about 1 mm which is six times as large as the value, and the apparent resolution is lowered. Further, as shown in FIG. 9, when display is performed in such a manner that three rows in the first arrangement are lighted, and next three rows are unlighted, too, the effect that the opening area length becomes constant in the first arrangements of two rows adjacent to each other in the vertical direction is lost. Three rows adjacent to each other in the second direction generally bear RGB, and hence the display of FIG. 9 is nothing but white lighting on every other row. This white lighting on every other row causes a killer pattern having the possibility of causing the moire. Specifically, when the focus is at point FP1, and when the focus is at point FP2, the sum of the opening area lengths become 285 and 270, respectively, if the difference between the opening area lengths is assumed to be 15% of 100%, 100% being the maximum opening area length, the sums of the opening area lengths become 285 and 270, which are different from each other. As for the resolution reduction (FIG. 9) at the time of monochromatic display, it is a problem of resolution, and hence it is dependent on the observation distance and the like, and it is not always a problem. As for the problem of the latter, the problem can be avoided by, for example, designing the structure in such a manner that the sum of the opening area lengths becomes constant in the first arrangements of three rows. Nevertheless, when the moire is eliminated by making the sum of the opening area lengths of a plurality of first arrangements in the second direction constant, if the presence of a killer pattern as shown in FIG. 9 is taken into account, it is effective to suppress the variation in the opening area length in a single arrangement to a certain degree. An allowable variation amount is obtained from the condition under which the variation in the brightness caused by the variation in the opening area length becomes equal to or less than the visual confirmation limit in the following manner.

The contrast of the brightness difference in the killer pattern is, when it is assumed that the maximum opening area length is 100, and the minimum opening area length is x (FIG. 9 corresponds to x=85), if 10% or less which is an allowable amount of the vertical opening area length that can make the contrast of the variation in the vertical opening area length in defocus equal to or less than the visual confirmation limit that has already appeared is taken into consideration, it is sufficient if (2×100+x):(2×x+100)=100:90 is satisfied, it is necessary to make x=72, i.e., the difference between the vertical opening area lengths in the single first arrangement be 28% (=100–72) or less on the assumption that the difference is canceled out by the sum of the opening area lengths in a plurality of first arrangements.

To summarize the above description, by designing in such a manner that the variation in the vertical opening area length in the single first arrangement is 28% or less, and the variation in the sum of the vertical opening area lengths in the plural first arrangements is 10% or less, the contrast of the moire can be made equal to or less than the visual confirmation limit by combining the design with the defocus effect of the lens. Incidentally, when the sum of the opening area lengths in the first arrangements in the second direction is made constant in three rows, the white lighting on every other row does not cause a killer pattern. That is, in the case of a color filter arrangement in which RGB is repeatedly arrayed in the second direction, it is sufficient if the vertical opening area length is cut by coordinates in the first direction in the first arrangements of six rows which are adjacent to each other in the second direction, it is cut in a ratio that can obtain (x+a), (x), (x−a), (x+a), (x), and (x−a) (x: fundamental vertical opening area length, a: variation amount). Further, if the cut result is arranged in order of (x+a), (x), (x−a), (x−a), (x), and (x+a) (x: fundamental vertical opening area length, a: variation amount), the monochromatic display does not cause a killer pattern. If it is attempted to make the sum of the vertical opening area lengths constant in a period longer than this, the effect of making the vertical opening area length constant in a plurality of first arrangements is diluted (it is made easier to be visually confirmed that the brightness differs from row to row depending on the resolution due to the separation distance).

Figure 13:
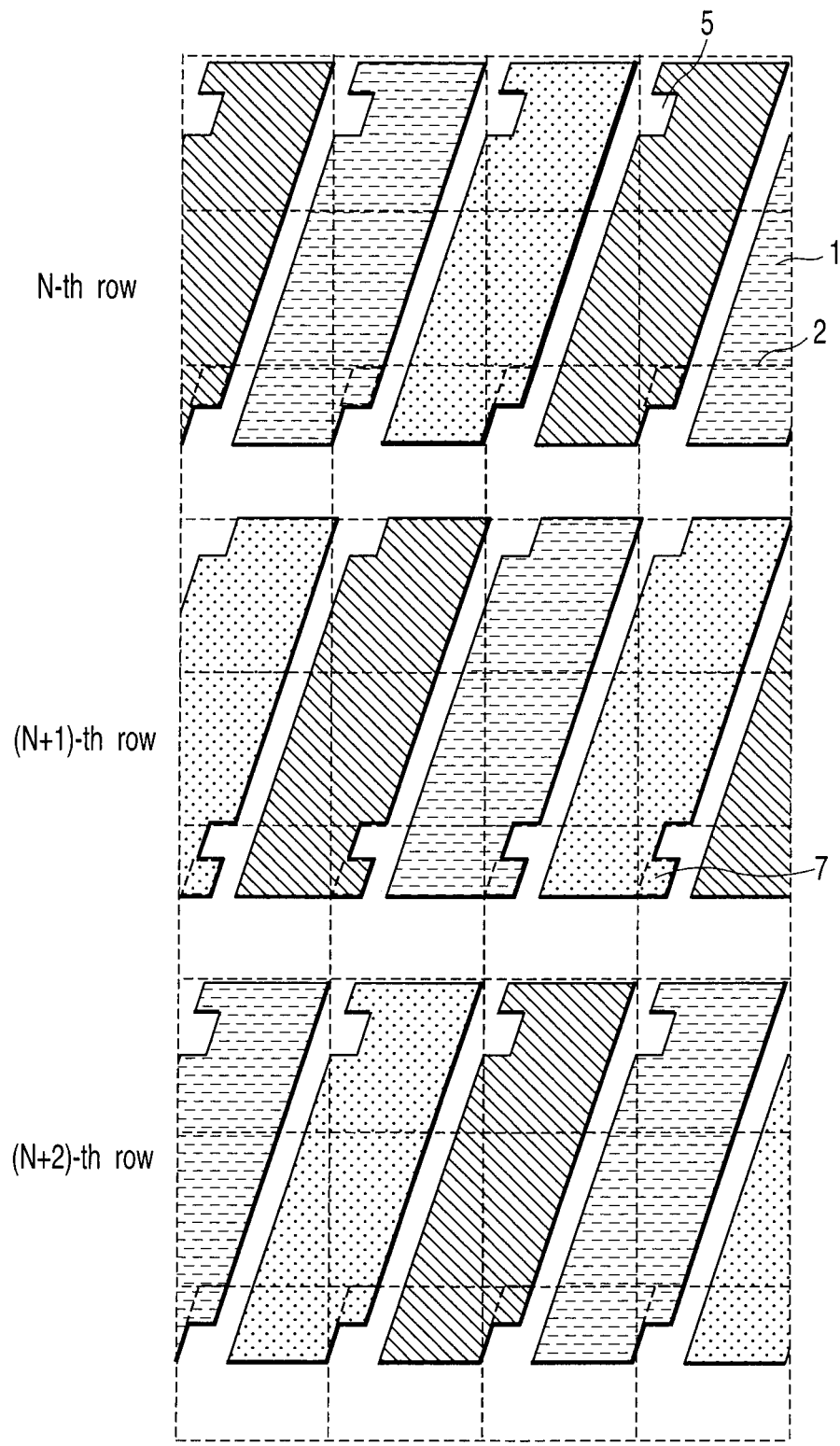
FIG. 13 is an enlarged view showing a part of a display section for displaying a flat image, in an enlarging manner, the display section constituting a three-dimensional image display apparatus according to still another embodiment of the present invention.
Figure 14:
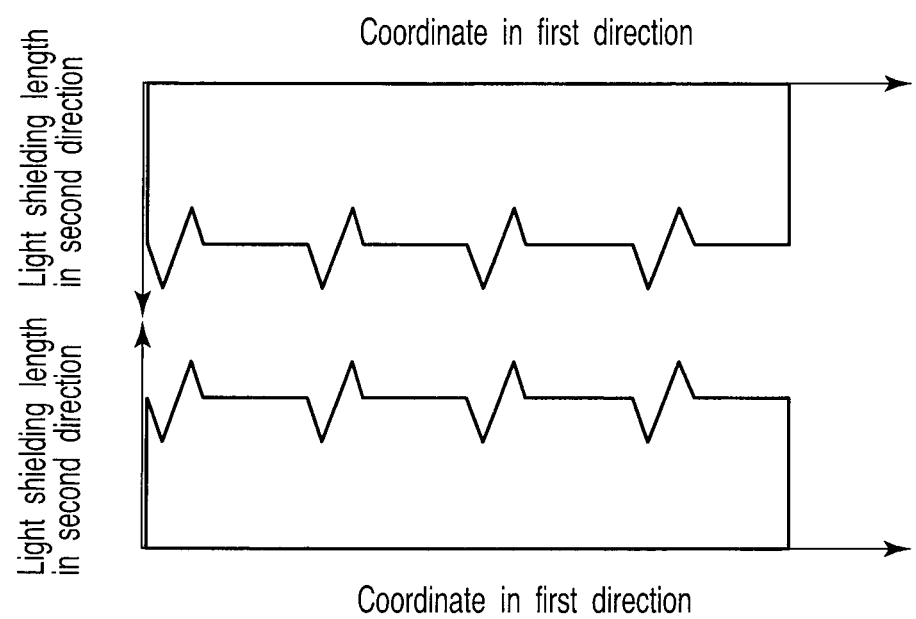
FIG. 14 is a graph showing the state of variation in a light shielding length of a sub-pixel in the display section shown in FIG. 5 for each first arrangement.

FIG. 13 is an enlarged view showing, in an enlarging manner, a part of a flat image display section of a three-dimensional image display apparatus according to another embodiment of the present invention. As shown in FIG. 13, in this display section, an opening area 1 shape of a substantially parallelogram shape is employed. Further, the color arrangement employs a mosaic. In this arrangement, although the opening area lengths in the first arrangements in the second direction (vertical direction) are not constant, an opening region 7 and a light shielding region 5 are provided, whereby the sum of the first arrangements in the two rows adjacent to each other in the vertical direction is made constant. Further, although the opening area shapes of the first arrangements in the Nth and (N+1)th rows are different from each other, their opening areas are equal to each other. FIG. 14 shows the state where the light shielding lengths in the second direction vary so as to cancel out each other in the first arrangements of the Nth and (N+1)th rows. FIG. 13 shows the mosaic arrangement, a lateral stripe color arrangement can also be employed as in the relationship between FIG. 1 and FIG. 4.

Figures 15A, 15C:
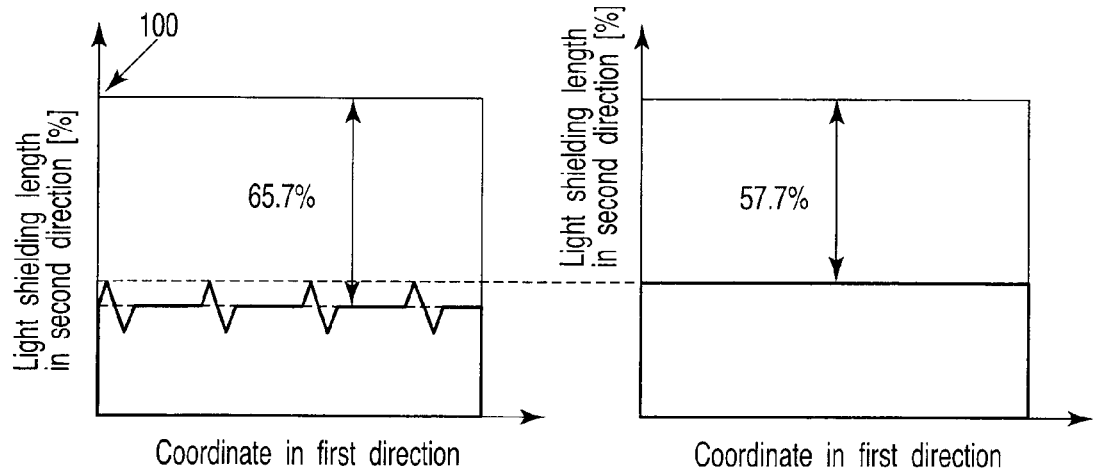
FIG. 15A is a graph for explaining an effect of preventing a numerical aperture from being lowered, and shows a variation in the light shielding length of an opening area shape of a first arrangement of an Nth row shown in FIG. 1 in the second direction (vertical direction).
FIG. 15C is a graph for explaining an effect of preventing a numerical aperture from being lowered, and shows that a numerical aperture is lowered as a result of preventing a variation in the light shielding length in the second direction (vertical direction) from being caused by providing a dummy shielding section 3 in FIG. 15A.
Figures 15B, 15D:
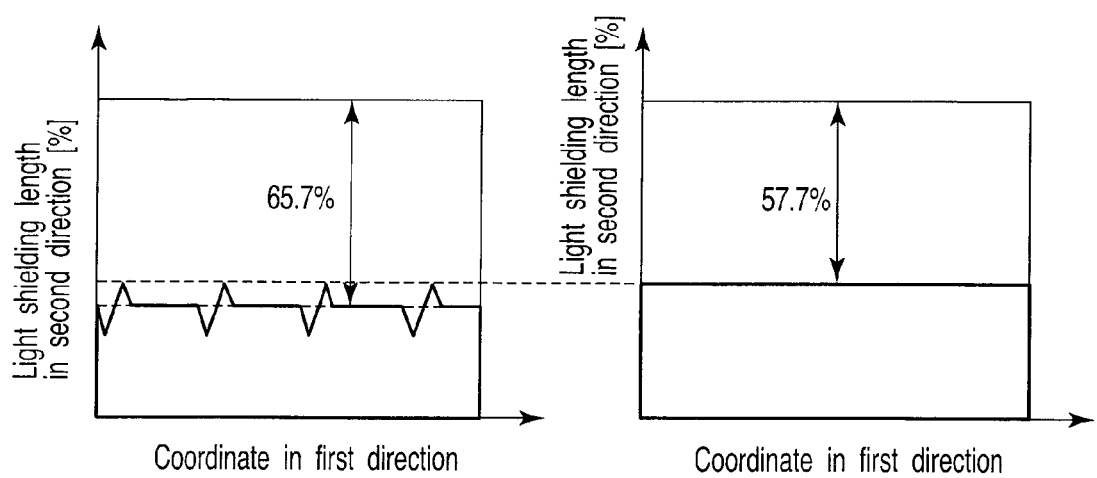
FIG. 15B is a graph for explaining an effect of preventing a numerical aperture from being lowered, and shows a variation in the light shielding length of an opening area shape of a first arrangement of an (N+1)th row shown in FIG. 1 in the second direction (vertical direction).
FIG. 15D is a graph for explaining an effect of preventing a numerical aperture from being lowered, and shows that a numerical aperture is lowered as a result of preventing a variation in the light shielding length in the second direction (vertical direction) from being caused by providing a dummy shielding section 3 in FIG. 15B.

The effect of increasing a numerical aperture by emptying the present invention will be described below by referring to FIGS. 15A to 15C. In FIGS. 15A and 15B, the drawing of the light shielding length shown in FIG. 2C is redrawn such that the occupation ratio can be comprehended. In each of the first arrangement of the Nth row shown in FIG. 15A and the first arrangement of the (N+1)th row, the average opening area length is 65.7%. On the other hand, if the opening area shape is controlled in such a manner that the light shielding section 3 becomes constant in the first arrangement of one row, thereby suppressing the brightness variation, the opening area length becomes 57.7% in each of the first arrangement of the Nth row and the first arrangement of the (N+1)th row as shown in FIGS. 15C and 15D, and the brightness of the 3D display is lowered to 88%, which is lower than that shown in FIG. 1 that is the example of this proposal.

Figure 16:
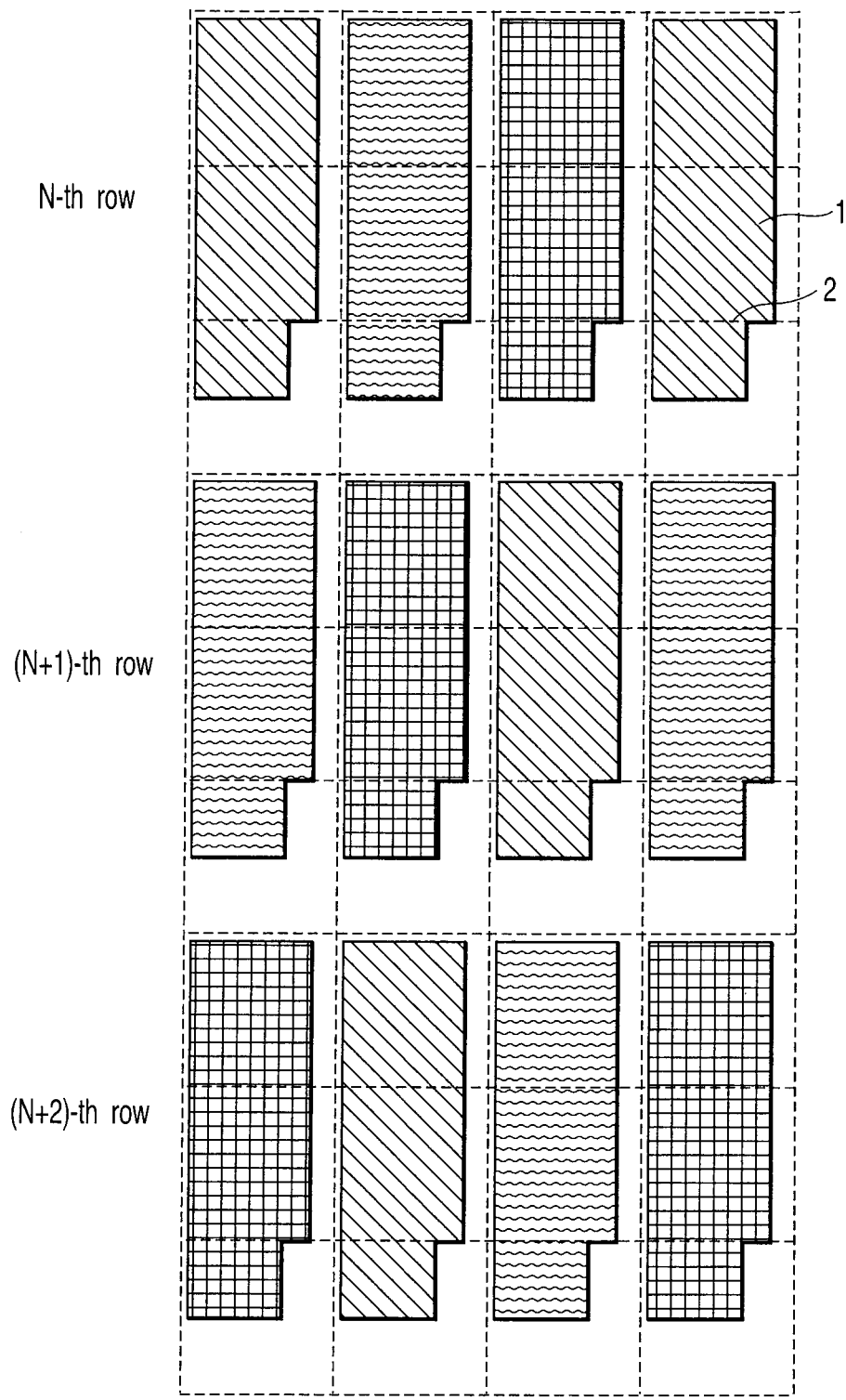
FIG. 16 is an enlarged view showing, in an enlarging manner, a part of a flat image display section in which vertical wiring is made to coincide with the second direction (vertical direction) as a comparative example.
Figure 17:
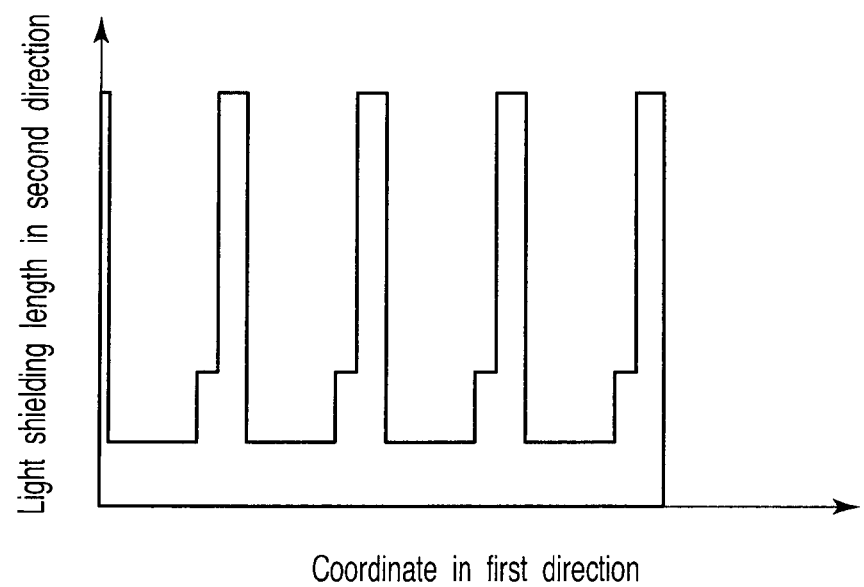
FIG. 17 is a graph showing the state of variation in the light shielding length of a sub-pixel in the display section shown in FIG. 16 for each first arrangement.

FIGS. 16 and 17 show the brightness variation in the case where the vertical wiring is made vertical. If the vertical wiring is provided so as to allow it to coincide with the second direction (vertical direction) which is the ridgeline of the lens that is the light ray control element, it becomes impossible to suppress the variation in the opening area length in the second direction (vertical direction) as shown in FIG. 17.

Figure 18:
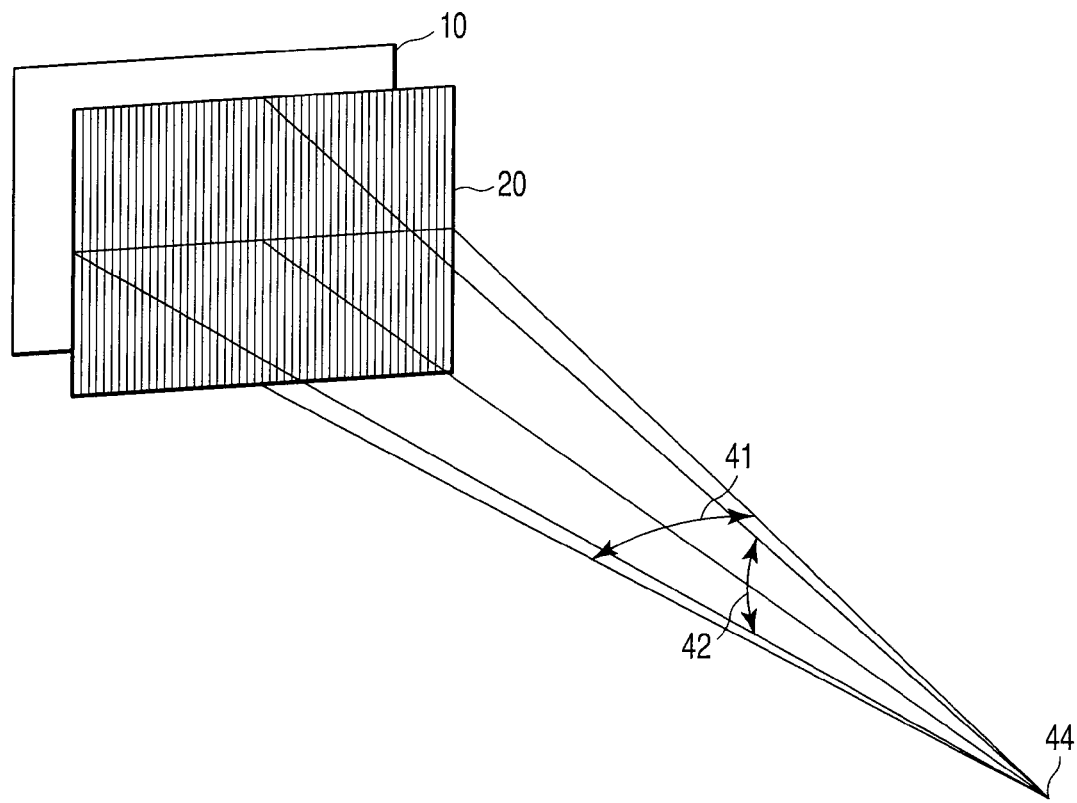
FIG. 18 is a perspective view schematically showing the entire configuration of the three-dimensional image display apparatus of the present invention.

FIG. 18 schematically shows the entirety of the three-dimensional image display apparatus. The flat image display section 10 shown in FIG. 18 is a high-definition liquid crystal panel module of a mosaic color filter arrangement in which sub-pixels 10 having opening areas 1 with a shape described previously are arranged in a matrix form. The flat image display section 10 may be a plasma display panel, an organic EL display panel, a field-emission display panel, and the like, and the type does not matter as long as the shape of the opening area 1 of the sub-pixel 10 and the color arrangement satisfy the condition described previously. A light control element 20 is provided so as to be opposed to the flat image display section. An assumed observer position is in the vicinity of the point 44, and a three-dimensional image can be observed in the vicinity of the front surface and the back surface of the light ray control element 20 in the range of the horizontal angle of view 41 and the vertical angle of view 42.

FIG. 19A is a perspective view of a lenticular sheet 334 serving as the light ray control element shown in FIG. 18, and FIG. 19B is a perspective view of a slit array 333 serving as the light ray control element shown in FIG. 18. A horizontal pitch Pe is a pitch in the direction coinciding with the pixel row direction of the flat image display section.

Figure 20A:
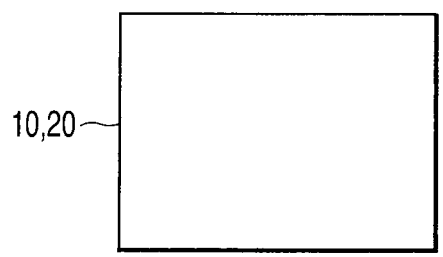
FIG. 20A is a developed view schematically showing the entire configuration of the three-dimensional image display apparatus shown in FIG. 18.
Figure 20C:
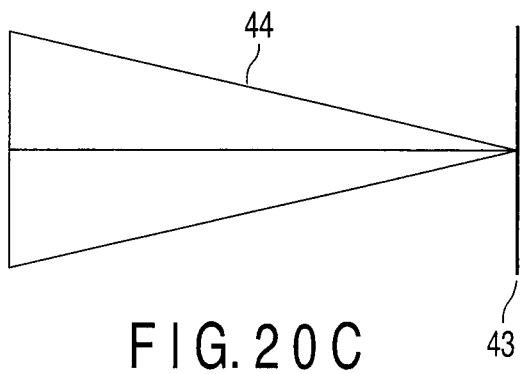
FIG. 20C is a developed view schematically showing the entire configuration of the three-dimensional image display apparatus shown in FIG. 18.
Figure 20B:
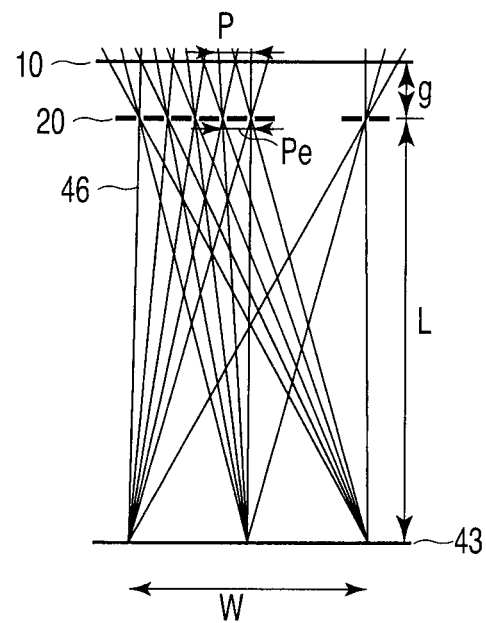
FIG. 20B is a developed view schematically showing the entire configuration of the three-dimensional image display apparatus shown in FIG. 18.

FIGS. 20A to 20C are developed views schematically showing a light ray reproduction range in the vertical plane and the horizontal plane determined by using the display section of the three-dimensional image display apparatus shown in FIG. 18 as a reference. In FIG. 20A, front views of the flat image display section 10 and the light ray control element 20 are shown. A plan view showing an image arrangement of the three-dimensional image display apparatus is shown in FIG. 20B. A side view of the three-dimensional image display apparatus is shown in FIG. 20C.

Figure 19:
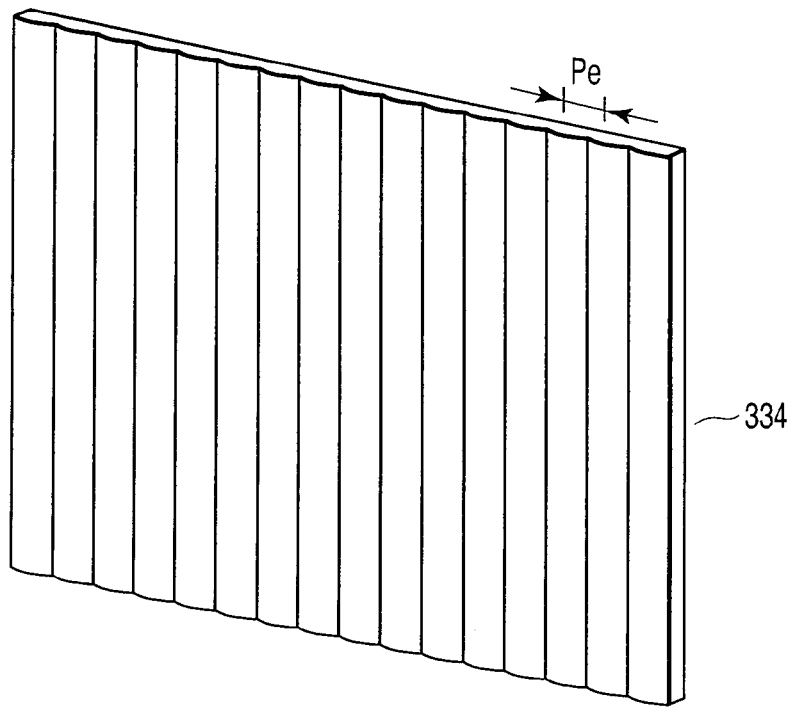
FIG. 19A is a perspective view schematically showing a light ray control element used in the three-dimensional image display apparatus shown in FIG. 18.
FIG. 19B is a perspective view schematically showing a light ray control element used in the three-dimensional image display apparatus shown in FIG. 18.
Figure 19:
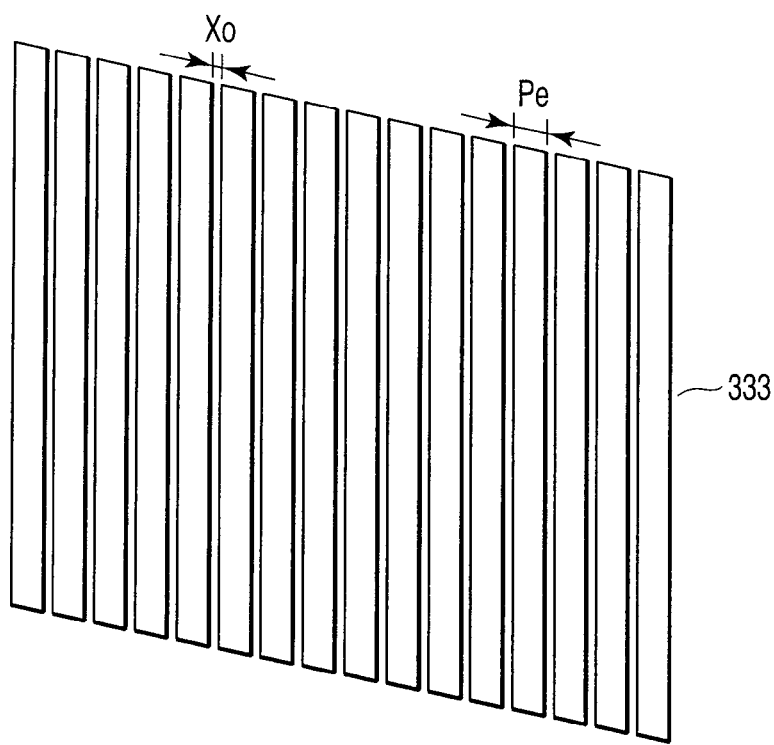

As shown in FIGS. 18 and 19, the three-dimensional image display apparatus is provided with a flat image display section 10 such as a liquid display panel, and a light ray control element 20 including optical openings.

In FIG. 20, if a visual range L between the light ray control element 20 and a visual range plane 43, a light ray control element horizontal pitch Pe, and a gap g between the light ray control element and the pixel surface are determined, an element image horizontal pitch P is determined by an interval obtained by projecting an aperture (or lens principal point) center from a visual point on the visual range plane 43 on the display element. A reference symbol 46 denotes a line connecting the visual point and each aperture center, and a visual field width W is determined from a condition that element images do not overlap each other on the display surface of the display apparatus. In the case of the one-dimensional II system having sets of parallel light rays as a condition, the average value of horizontal pitches of the element images is slightly larger than an integral multiple of the pixel horizontal pitch, and the horizontal pitch of the light ray control element is equal to the integral multiple of the pixel horizontal pitch. In the case of the multi-eye system, the horizontal pitch of the element images is equal to the integral multiple of the pixel horizontal pitch, and the horizontal pitch of the light ray control element is slightly smaller than the integral multiple of the pixel horizontal pitch.

FIG. 21 is a perspective view schematically showing the configuration of a part of a three-dimensional image display apparatus according to the present invention. FIG. 21 shows a case where a cylindrical lens array (lenticular sheet) 201 is disposed in front of a planate flat image display section such as a liquid crystal panel. As shown in FIG. 21, on the display surface of the display apparatus, sub-pixels 31 each having an aspect ratio of 3:1 are linearly arranged in the lateral direction and the longitudinal direction in a matrix form, and each pixel 31 is arranged in such a manner that red (R), green (G), and blue (B) pixels are alternately arrayed in the row direction and in the column direction. This color arrangement is generally called a mosaic arrangement. The shape of the opening area 1 of the sub-pixel 31 is the shape shown in FIG. 1, 7 or 13. Sub-pixels 31 of 9 columns by 3 rows constitute a three-dimensional display time pixel 32 (indicated by a black frame). In such a structure of the display section, the three-dimensional display time pixel is constituted of 27 sub-pixels, and hence a three-dimensional image/image display which provides 9 parallax is enabled.

By the method described above, in the three-dimensional image display apparatus in which the light ray control element is vertically disposed, moire that hinders the display is not caused, the brightness is prevented from being lowered, and the image quality of the overall three-dimensional image is improved.

Incidentally, the present invention is not limited to the embodiments described above, and the constituent elements can be modified and embodied within the range not deviating from the gist of the invention.

Further, by appropriately combining a plurality of constituent elements disclosed in the embodiments described above, various inventions can be formed. For example, some constituent elements may be deleted from the entire constituent elements shown in the embodiments. Further, constituent elements of different embodiments may be appropriately combined with each other.

According to the present invention, in a three-dimensional image display apparatus in which a light ray control element having periodicity limited to a first direction (horizontal direction) and a flat display device provided with pixels in the first and second directions (vertical and horizontal directions) in a matrix form are combined with each other, there is no need to provide a dummy the light shielding section as moire dispelling measures, even if a dummy the light shielding section is provided, moire can be dispelled with a less area of the dummy the light shielding section, and brightness deterioration incidental to lowering of the numerical aperture can be prevented from occurring.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for displaying a three-dimensional image, comprising:
   a display unit including a plurality of first and second groups of sub-pixels respectively colored, each of the first and second groups of sub-pixels being arranged in an array of rows in a first direction and the first and second groups of sub-pixels being adjacently arranged in columns in a second direction, each of the sub-pixels having an opening area and first and second light shielding areas, the first light shielding area extending in the first direction between the first and second groups of the sub-pixels to separate the opening areas in the first group of the sub-pixels from the opening areas in the second group of the sub-pixels, and the second light shielding areas being located between the opening areas of the adjacent sub-pixels in each of the first and second groups to separate the opening areas of the adjacent sub-pixels, wherein
   each opening area has a plurality of opening lengths extending in the second direction;
   opening lengths of opening areas in each of the first and second groups of the sub-pixels, as distributed along the first direction, are substantially inconstant; and
   integrated lengths of opening areas in the first and second groups of the sub-pixels, as distributed along the first direction, are more constant than the opening lengths of opening areas in each of the first and second groups of the sub-pixels, each of the integrated lengths corresponding to a sum of the opening lengths of two immediately adjacent opening areas separated by the first light shielding area in the first and second groups of sub-pixels; and
   a light ray control unit, facing the display unit, configured to control light rays from the sub-pixels of the display unit, the light ray control unit including a plurality of optical openings extending substantially linearly in the second direction and arranged in the first direction.

2. The apparatus according to claim 1, wherein a variation in the integrated lengths is substantially equal to 10% or less along the first direction, 3. The apparatus according to claim 1, wherein a variation in the opening lengths of opening areas in each row is substantially equal to 28% or less along the first direction.

4. The apparatus according to claim 1, wherein all of the sub-pixels have substantially same numerical aperture.

5. The apparatus according to claim 1, wherein the sub-pixels having the same color are arranged along the second direction.

6. The apparatus according to claim 1, wherein a color arrangement of the sub-pixels is a mosaic arrangement.

7. The display apparatus according to claim 1, wherein a color arrangement of the sub-pixels is a lateral stripe arrangement.

8. The display apparatus according to claim 1, wherein the light shielding area includes wiring bent to form a zigzag line in the second direction.

9. The display apparatus according to claim 1, wherein each of the sub-pixels has a substantially parallelogram shape, and the sub-pixels are arranged in such a manner that an inclination of the sub-pixel is alternatively reversed in an even row of the array and an odd row of the array.

10. The display apparatus according to claim 1, wherein each of the sub-pixels has a substantially doglegged shape.

* * * * *